(12) United States Patent
Ahn et al.

(10) Patent No.: US 8,553,635 B2
(45) Date of Patent: Oct. 8, 2013

(54) UPLINK ACK/NACK SIGNALING IN CARRIER AGGREGATION ENVIRONMENT

(75) Inventors: Joon Kui Ahn, Anyang-si (KR); Jung Hoon Lee, Anyang-si (KR); Suck Chel Yang, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 302 days.

(21) Appl. No.: 13/139,429

(22) PCT Filed: Dec. 22, 2009

(86) PCT No.: PCT/KR2009/007682
§ 371 (c)(1),
(2), (4) Date: Jun. 13, 2011

(87) PCT Pub. No.: WO2010/074490
PCT Pub. Date: Jul. 1, 2010

(65) Prior Publication Data
US 2011/0243088 A1 Oct. 6, 2011

Related U.S. Application Data

(60) Provisional application No. 61/140,079, filed on Dec. 23, 2008, provisional application No. 61/148,369, filed on Jan. 29, 2009, provisional application No. 61/169,318, filed on Apr. 15, 2009, provisional application No. 61/218,984, filed on Jun. 21, 2009.

(30) Foreign Application Priority Data

Dec. 11, 2009 (KR) .................. 10-2009-0123316

(51) Int. Cl.
*H04W 4/00* (2009.01)

(52) U.S. Cl.
USPC ............................................. 370/329; 455/450

(58) Field of Classification Search
None
See application file for complete search history.

(56) References Cited

U.S. PATENT DOCUMENTS

| | | | |
|---|---|---|---|
| 8,385,239 B2 * | 2/2013 | Golitschek Edler Von Elbwart et al. ............................ 370/310 |
| 8,396,156 B2 * | 3/2013 | Obuchi et al. ................. 375/267 |
| 2004/0162083 A1 | 8/2004 | Chen et al. |
| 2004/0179493 A1 | 9/2004 | Khan |
| 2009/0003486 A1 | 1/2009 | Kwon et al. |
| 2009/0221289 A1 * | 9/2009 | Xu et al. .................... 455/435.1 |
| 2012/0069815 A1 * | 3/2012 | Aiba et al. .................... 370/329 |

FOREIGN PATENT DOCUMENTS

| | | |
|---|---|---|
| KR | 10-2004-0081060 A | 9/2004 |
| KR | 10-2005-0109497 A | 11/2005 |
| KR | 10-2008-0065559 A | 7/2008 |
| KR | 10-2008-0105006 A | 12/2008 |

* cited by examiner

*Primary Examiner* — Jianye Wu
(74) *Attorney, Agent, or Firm* — Birch, Stewart, Kolasch & Birch, LLP

(57) ABSTRACT

An uplink ACK/NACK signaling method and apparatus in carrier aggregation environment are disclosed. The method for performing a HARQ procedure by a user equipment in a wireless communication system includes receiving one or more control channels carrying downlink scheduling information from a base station (BS), wherein each control channel carries information indicating a total number of control channels transmitted from the BS to the UE, and determining whether the total number of control channels transmitted to the UE is identical to the number of control channels received at the UE.

22 Claims, 12 Drawing Sheets

E-UMTS

Fig. 2
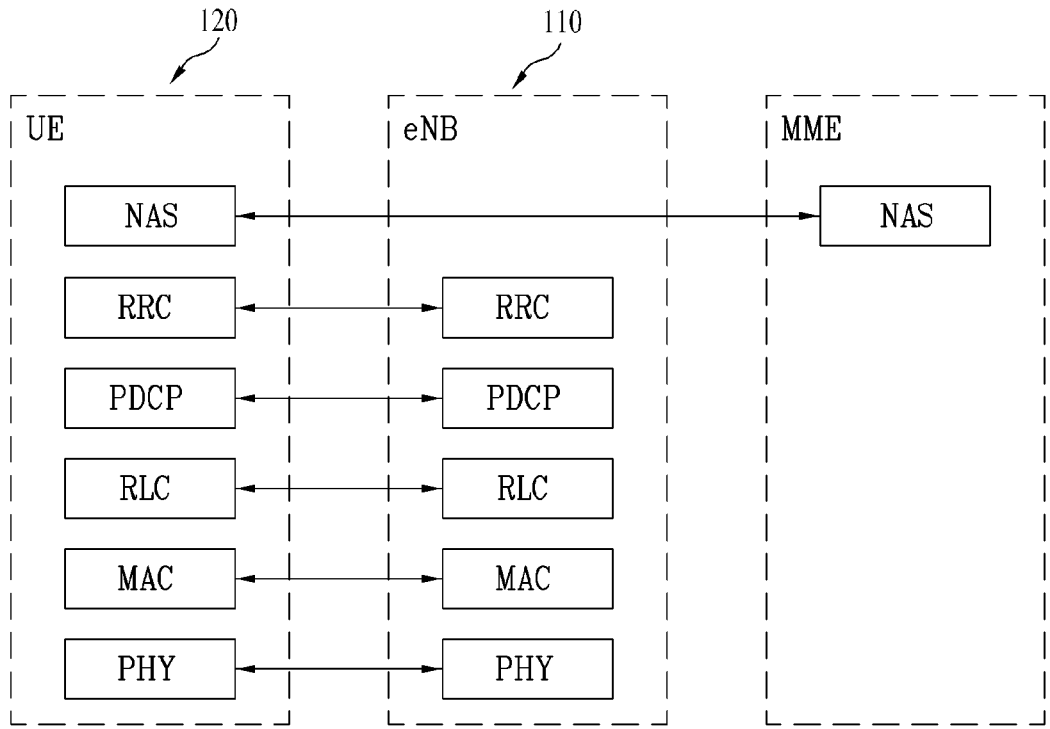
(a) Control-plane protocol stack
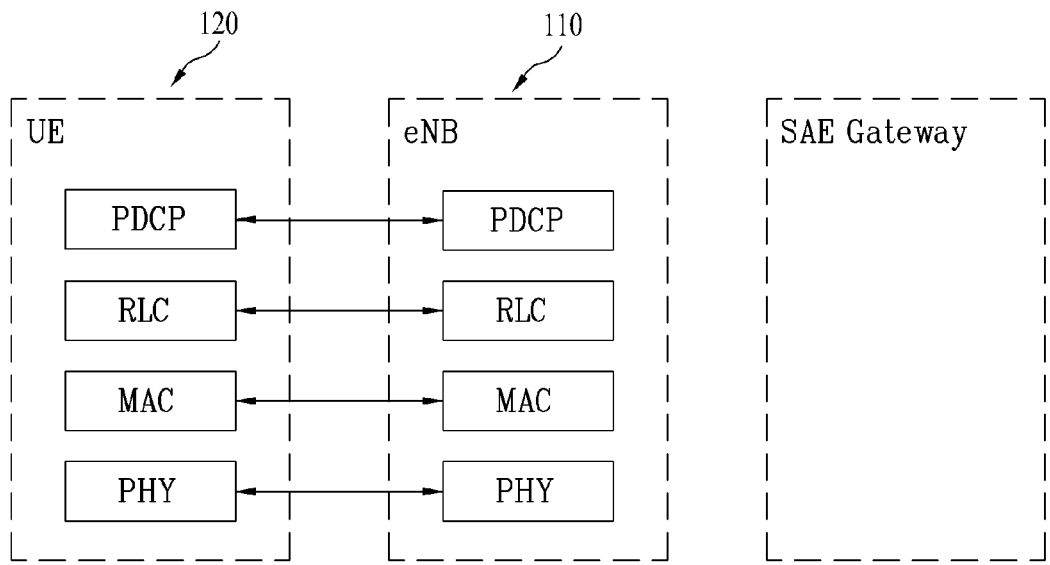
(b) User-plane protocol stack Fig. 5
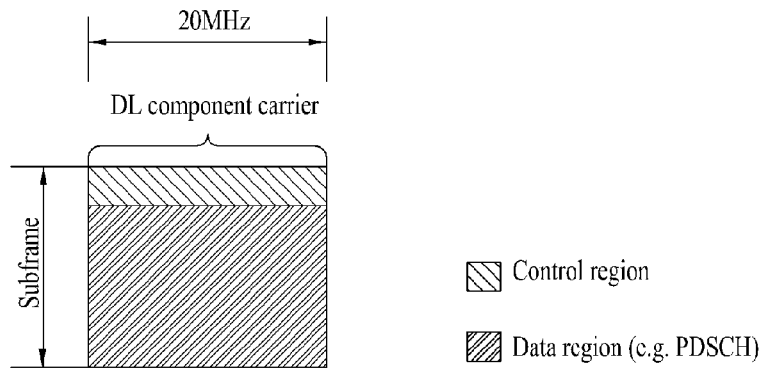
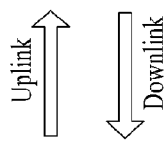
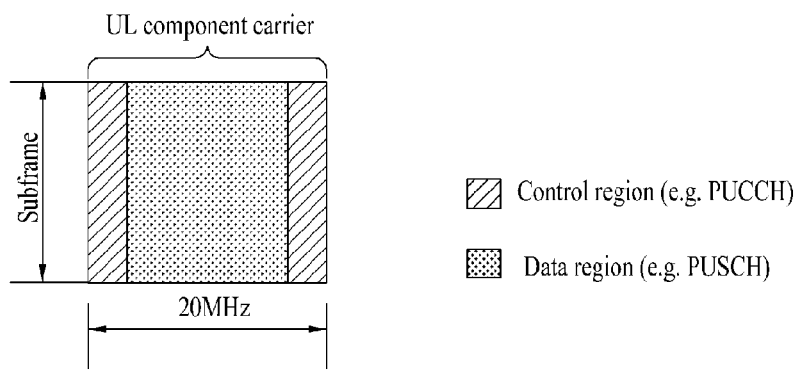
Single component carrier (e.g. LTE system)
Fig. 6
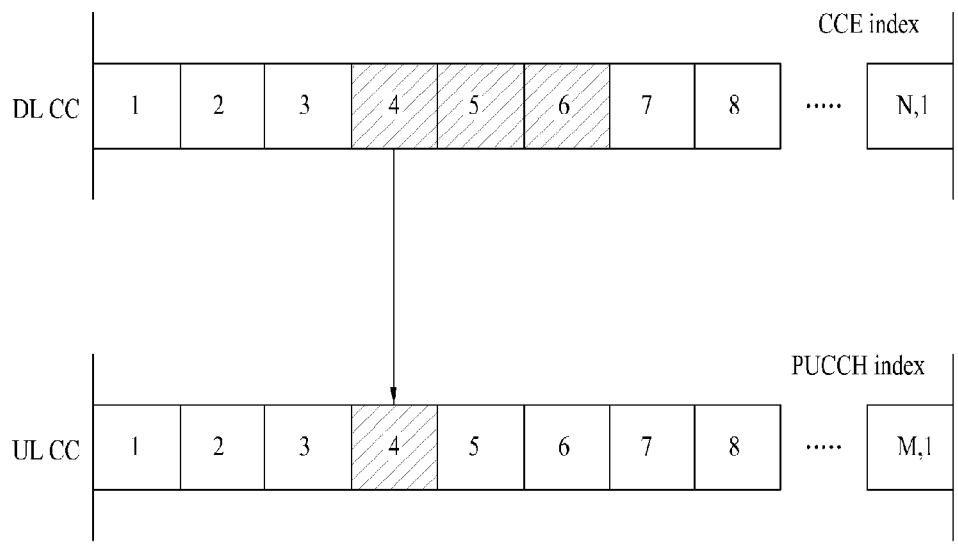

Fig. 15
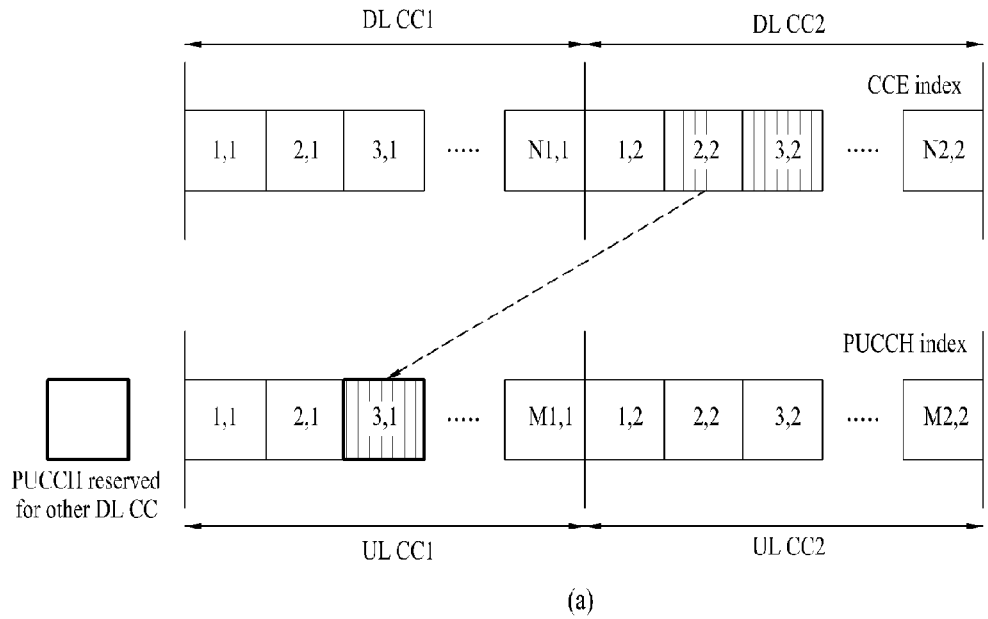
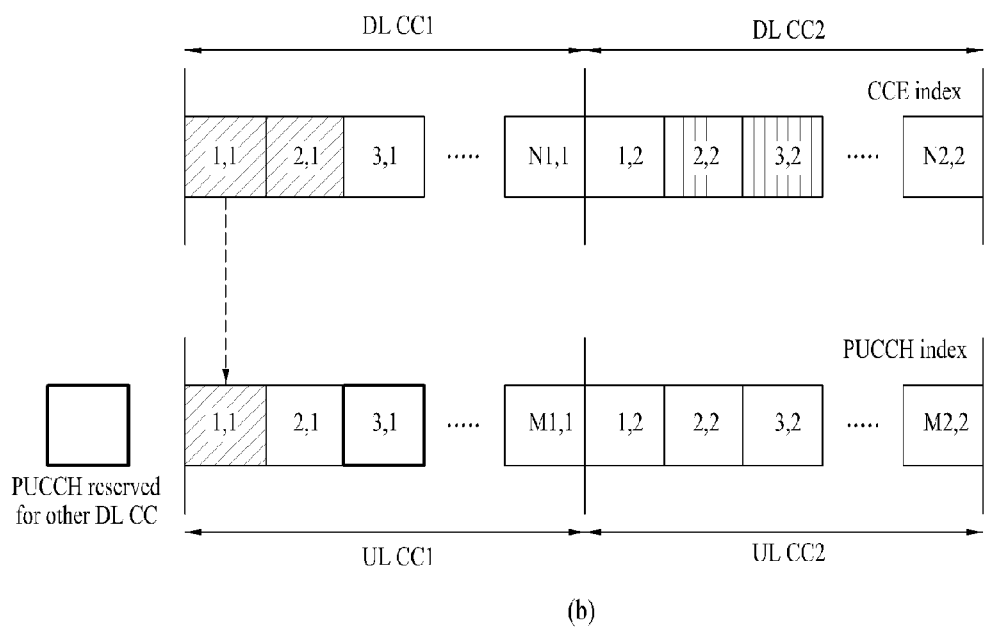
Fig. 16
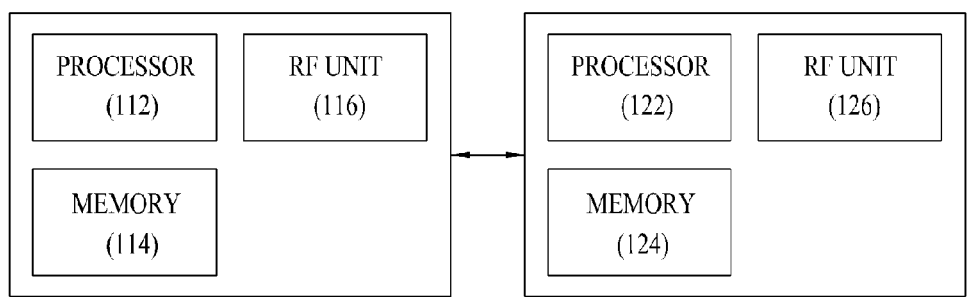

UPLINK ACK/NACK SIGNALING IN CARRIER AGGREGATION ENVIRONMENT

This application is a National Phase of PCT/KR2009/007682 filed on Dec. 22, 2009, which claims priority under 35 USC 119(e) to U.S. Provisional Application Nos. 61/140,079 filed Dec. 23, 2008, 61/148,369 filed Jan. 29, 2009, 61/169,318 filed Apr. 15, 2009 and 61/218,984 filed Jun. 21, 2009 and under 35 USC 119(a) to Patent Application No. 10-2009-0123316 filed in Republic of Korea, on Dec. 11, 2009, all of which are hereby expressly incorporated by reference into the present application.

TECHNICAL FIELD

The present invention relates to a wireless communication system, and more particularly to an uplink acknowledgement/negative acknowledgement (ACK/NACK) signaling method and apparatus in a carrier aggregation environment.

BACKGROUND ART

A wireless communication system has been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used, for example, a Code Division Multiple Access (CDMA) system, a Frequency Division Multiple Access (FDMA) system, a Time Division Multiple Access (TDMA) system an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE OF INVENTION

Technical Problem

Accordingly, the present invention is directed to an uplink ACK/NACK signaling method and apparatus in a carrier aggregation environment that substantially obviates one or more problems due to limitations and disadvantages of the related art.

An object of the present invention devised to solve the problem lies on a method and apparatus for effectively performing uplink ACK/NACK signaling in a wireless communication system capable of supporting carrier aggregation. Another object of the present invention devised to solve the problem lies on a method and apparatus capable of reducing the number of errors in ACK/NACK information generable when a user equipment (UE) receives data through a plurality of component carriers (CCs).

It is to be understood that technical problems to be solved by the present invention are not limited to the aforementioned technical problems and other technical problems which are not mentioned will be apparent from the following description to the person with an ordinary skill in the art to which the present invention pertains.

Solution to Problem

The object of the present invention can be achieved by providing a method for performing a hybrid automatic repeat and request (HARQ) procedure by a user equipment (UE) in a wireless communication system, the method including receiving one or more control channels carrying downlink scheduling information from a base station (BS), wherein each control channel carries specific information indicating a total number of control channels transmitted from the BS to the UE, and determining whether the total number of control channels transmitted to the UE is identical to the number of control channels received at the UE.

In another aspect of the present invention, a UE of a wireless communication system includes a Radio Frequency (RF) unit to transmit and receive an RF signal to and from a base station (BS), a memory for storing information transmitted/received to/from the BS and parameters needed for operating the UE, and a processor that is connected to the RF unit and the memory and controls the RF unit and the memory to operate the UE. The processor receives one or more control channels carrying downlink scheduling information from the BS, wherein each control channel carries information indicating a total number of control channels transmitted from the BS to the UE, and determines whether the total number of control channels transmitted to the UE is identical to the number of control channels received at the UE.

The control channel may include a physical downlink control channel (PDCCH). The one or more control channels may be simultaneously received. For example, the one or more control channels may be received either at the same transmission time interval (TTI) or at the same subframe according to the FDD scheme. In addition, the one or more control channels may be received at the same subframe over several downlink component carriers. If the total number of control channels transmitted to the UE is different from the number of control channels received at the UE, a process for transmitting acknowledgement/negative acknowledgement (ACK/NACK) information to the BS is omitted. If the total number of control channels transmitted to the UE is different from the number of control channels received at the UE, NACK information is transmitted to the BS.

In another aspect of the present invention, provided herein is a method for performing a hybrid automatic repeat and request (HARQ) procedure by a user equipment (UE) in a wireless communication system, the method includes receiving one or more downlink control channels carrying downlink scheduling information from a base station (BS), wherein each downlink control channel carries information indicating an order value of each downlink control channel within a plurality of downlink control channels transmitted from the BS to the UE, and determining whether or not the one or more downlink control channels received from the BS are contiguous in order.

In another aspect of the present invention, a UE of a wireless communication system includes a Radio Frequency (RF) unit to transmit and receive an RF signal to and from a base station (BS), a memory for storing information transmitted/received to/from the BS and parameters needed for operating the UE, and a processor that is connected to the RF unit and the memory and controls the RF unit and the memory to operate the UE. The processor includes receiving one or more downlink control channels carrying downlink scheduling information from a base station (BS), wherein each downlink control channel carries information indicating an order value of each downlink control channel within several downlink control channels transmitted from the BS to the UE, and determining whether or not the one or more downlink control channels received from the BS are contiguous in order.

In this case, the one or more control channels may be simultaneously received. For example, the one or more control channels may be received either at the same transmission time interval (TTI) or at the same subframe according to the FDD scheme. In addition, the one or more control channels may be received at the same subframe over several downlink component carriers.

If order values of the received one or more control channels are not contiguous, a process for transmitting acknowledgement/negative acknowledgement (ACK/NACK) information to the BS may be omitted. If order values of the received one or more control channels are not contiguous, NACK information is transmitted to the BS. The method may further include transmitting ACK/NACK information where downlink data corresponding to a downlink physical channel of a non-received order value is set to NACK information to the BS, if order values of the received one or more control channels are not contiguous. The method may further include transmitting ACK/NACK information to the BS over an uplink control channel corresponding to a downlink control channel having a last order value, if order values of the received one or more control channels are not contiguous.

In another aspect of the present invention, provided herein is a method for performing a hybrid automatic repeat and request (HARQ) procedure by a user equipment (UE) in a wireless communication system, the method including receiving a plurality of downlink control channels, each downlink control channel carrying downlink scheduling information from a base station (BS), recognizing a specific downlink control channel indicated to correspond to an uplink control channel from among the plurality of downlink control channels, and transmitting acknowledgement/negative acknowledgement (ACK/NACK) information over an uplink control channel related to the specific downlink control channel.

In another aspect of the present invention, a UE of a wireless communication system includes a Radio Frequency (RF) unit to transmit and receive an RF signal to and from a base station (BS), a memory for storing information transmitted/received to/from the BS and parameters needed for operating the UE, and a processor that is connected to the RF unit and the memory and controls the RF unit and the memory to operate the UE. The processor receives a plurality of downlink control channels, each downlink control channel carrying downlink scheduling information from a base station (BS), recognizes a specific downlink control channel indicated to correspond to an uplink control channel from among the plurality of downlink control channels, and transmits acknowledgement/negative acknowledgement (ACK/NACK) information over an uplink control channel related to the specific downlink control channel.

In this case, the one or more control channels may be simultaneously received. For example, the one or more control channels may be received either at the same transmission time interval (TTI) or at the same subframe according to the FDD scheme. In addition, the one or more control channels may be received at the same subframe over several downlink component carriers. The specific downlink control channel may be recognized using one-bit (1-bit) information contained in the downlink scheduling information. In this case, the one-bit information may be contained in the downlink scheduling information. The specific downlink control channel may be indicated by changing either scrambling or Cyclic Redundancy Check (CRC) masking applied to each downlink control channel.

Advantageous Effects of Invention

Exemplary embodiments of the present invention have the following effects. Uplink ACK/NACK signaling can be effectively carried out in a wireless communication system for supporting carrier aggregation. In addition, the embodiments can reduce the number of errors in ACK/NACK information generable when the UE receives data through several CCs.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 2 is a diagram illustrating structures of a radio interface protocol between a user equipment (UE) and an E-UTRAN based on the 3GPP radio access network standard.

FIG. 5 is a diagram illustrating an example of communication under a single component carrier.

FIG. 6 is a conceptual diagram illustrating the relationship between a Physical Uplink Control CHannel (PUCCH) and a Physical Downlink Control CHannel (PDCCH) for ACK/NACK transmission.

FIGS. 13 to 15 are conceptual diagrams illustrating methods for determining a PUCCH to transmit ACK/NACK information when a UE receives several PUCCHs according to one embodiment of the present invention.

FIG. 16 is a block diagram illustrating a Base Station (BS) and a User Equipment (UE) applicable to embodiments of the present invention.

MODE FOR THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, for example, a CDMA, a FDMA, a TDMA, an OFDMA, an SC-FDMA, an MC-FDMA, and the like. The CDMA can be implemented by wireless communication technologies, such as Universal Terrestrial Radio Access (UTRA) or CDMA2000. The TDMA can be implemented by wireless communication technologies, for example, a Global System for Mobile communications (GSM), a General Packet Radio Service (GPRS), an Enhanced Data Rates for GSM Evolution (EDGE), etc. The OFDMA can be implemented by wireless communication technologies, for example, an IEEE 802.11 (Wi-Fi), an IEEE 802.16 (WiMAX), an IEEE 802.20, an E-UTRA (Evolved UTRA), and the like. The UTRA is a part of a Universal Mobile Telecommunications System (UMTS). The 3rd Generation Partnership Project (3GPP) Long Term Evolution (LTE) is a part of an Evolved UMTS (E-UMTS) that uses an E-UTRA. The LTE Advanced (LTE-A) is an evolved version of the 3GPP LTE.

Although the following embodiments of the present invention will hereinafter describe inventive technical characteristics on the basis of the 3GPP system, it should be noted that the following embodiments will be disclosed only for illustrative purposes and the scope and spirit of the present invention are not limited thereto.

Figure 1:
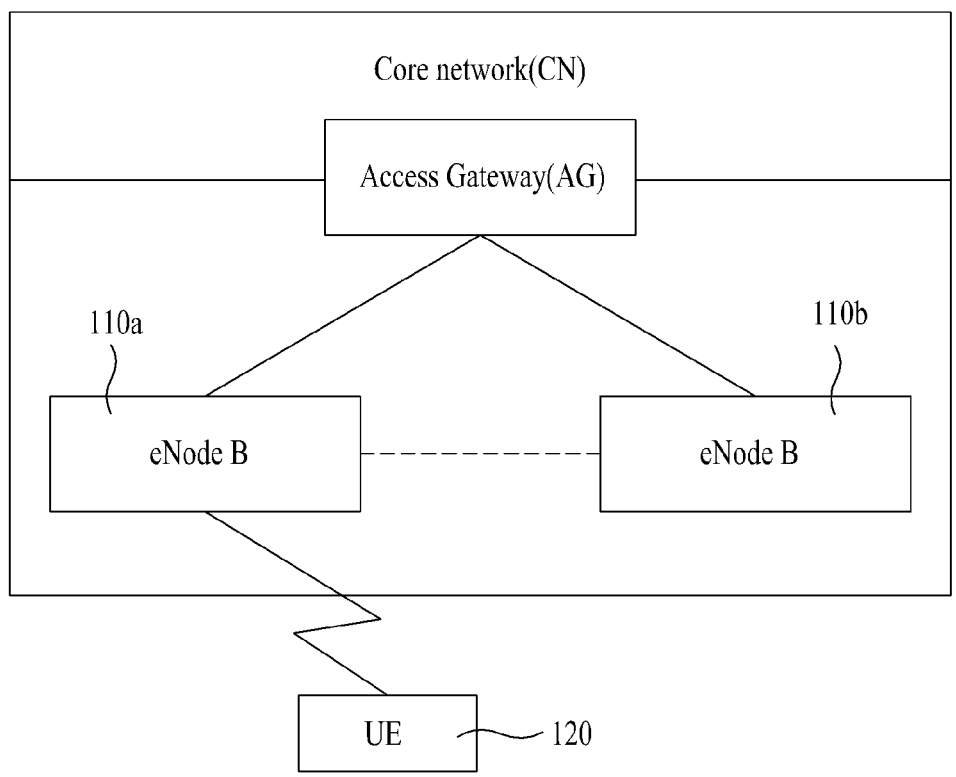
FIG. 1 is a diagram illustrating a network structure of an Evolved Universal Mobile Telecommunications System (E-UMTS).

FIG. 1 is a diagram illustrating a network structure of an Evolved Universal Mobile Telecommunications System (E-UMTS). The E-UMTS may also be referred to as a Long Term Evolution (LTE) system. For details of the technical specifications of the UMTS and the E-UMTS, refer to Release 7 and Release 8 of 3rd Generation Partnership Project; Technical Specification Group Radio Access Network.

Referring to FIG. 1, the E-UMTS includes a User Equipment (UE) 120, base stations (eNode Bs or eNBs) 110a and 110b, and an Access Gateway (AG) which is located at an end of a network (E-UTRAN) and connected to an external network. The base stations can simultaneously transmit multiple data streams for a broadcast service, a multicast service and/or a unicast service. One or more cells may exist for one base station. One cell is set to one of bandwidths of 1.25, 2.5, 5, 10, and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify information related to time and frequency domains to which data will be transmitted, encoding, data size, and hybrid automatic repeat and request (HARQ). Also, the base station transmits uplink (UL) scheduling information of uplink data to the corresponding user equipment to notify information related to time and frequency domains that can be used by the corresponding user equipment, encoding, data size, and HARQ. An interface for transmitting user traffic or control traffic can be used between the base stations. A Core Network (CN) may include the AG and a network node or the like for user registration of the UE. The AG manages mobility of a UE on a Tracking Area (TA) basis, wherein one TA includes a plurality of cells.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used in the user equipment (UE) and the network to manage call. The user plane means a passageway where data generated in an application layer, for example, voice data or Internet packet data are transmitted.

A physical layer as a first layer provides an information transfer service to an upper layer using a physical channel. The physical layer is connected to a medium access control layer above the physical layer via a transport channel. Data is transferred between the medium access control (MAC) layer and the physical layer via the transport channel. Data are transferred between one physical layer of a transmitting side and the other physical layer of a receiving side via the physical channel. The physical channel uses time and frequency as radio resources. Specifically, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control layer of a second layer provides a service to a radio link control (RLC) layer above the MAC layer via a logical channel. The RLC layer of the second layer supports reliable data transfer. The RLC layer may be implemented as a functional block inside the MAC layer. In order to effectively transmit IP packets such as IPv4 or IPv6 within a radio interface having a narrow bandwidth, a packet data convergence protocol (PDCP) layer of the second layer performs header compression to reduce the size of unnecessary control information.

A radio resource control (hereinafter, abbreviated as RRC) layer located on a lowest part of a third layer is defined in the control plane only. The RRC layer is associated with configuration, re-configuration and release of radio bearers (hereinafter, abbreviated as RBs) to be in charge of controlling the logical, transport and physical channels. In this case, the RB means a service provided by the second layer for the data transfer between the user equipment (UE) and the network. To this end, the RRC layers of the user equipment (UE) and the network exchange RRC messages with each other. If the RRC layer of the user equipment (UE) is RRC connected with the RRC layer of the network, the user equipment (UE) is in RRC connected mode. If not so, the user equipment is in RRC idle mode. A non-access stratum (NAS) layer located above the RRC layer performs functions such as session management and mobility management.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
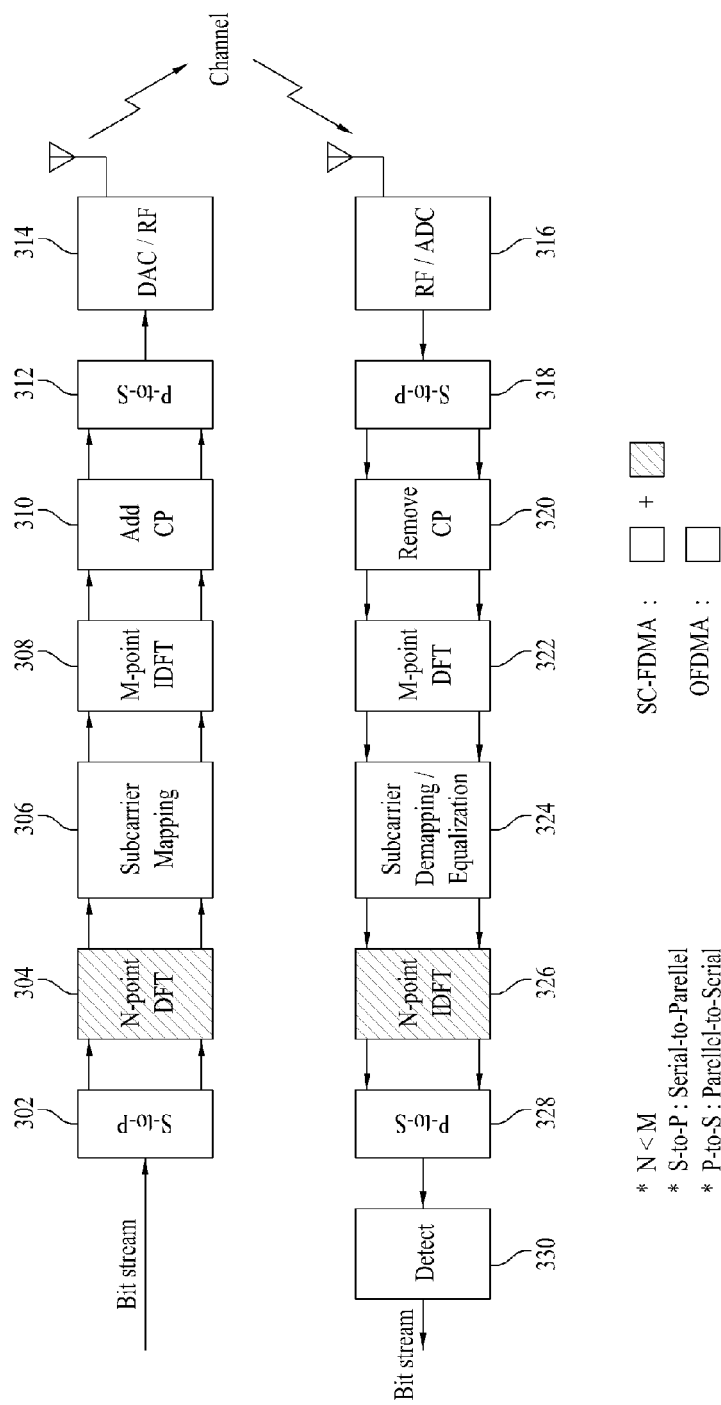
FIG. 3 is a block diagram illustrating a transmitter and a receiver for OFDMA and SC-FDMA.

FIG. 3 is a block diagram illustrating a transmitter and a receiver for OFDMA and SC-FDMA. In the uplink, transmitters 302 to 314 are parts of the user equipment (UE), and receivers 316 to 330 are parts of the base station (BS). In the downlink, the transmitters are parts of the base station (BS), and the receivers are parts of the user equipment (UE).

Referring to FIG. 3, an OFDMA transmitter includes a serial to parallel converter 302, a sub-carrier mapping module 306, an M-point inverse discrete Fourier transform (IDFT) module 308, a cyclic prefix (CP) addition module 310, a parallel to serial converter 312, and a radio frequency (RF)/digital to analog converter (DAC) module 314.

A signal processing procedure in the OFDMA transmitter will be described below. First of all, bit streams are modulated to data symbol sequences. The bit streams can be obtained by performing various signal processes, such as channel encoding, interleaving and scrambling, for a data block transferred from the MAC layer. The bit streams may be designated as codewords, and are equivalent to the data block transferred from the MAC layer. The data block transferred from the MAC layer may be designated as a transmission block. Examples of a modulation scheme include, but not limited to, BPSK (binary phase shift keying), QPSK (quadrature phase shift keying), and n-QAM (quadrature amplitude modulation). The data symbol sequences in series are converted to parallel data symbol sequences as much as N (302). N number of data symbols are mapped with N number of subcarriers allocated among a total of M number of subcarriers, and the other M-N number of carriers are padded with 0 (306). The data symbols mapped in a frequency domain are converted to time region sequences through M-point IDFT processing (308). Afterwards, in order to reduce inter-symbol interference (ISI) and inter-carrier interference (ICI), cyclic prefix is added to the time region sequences to generate OFDMA symbols (310). The generated OFDMA symbols are converted from parallel symbols to serial symbols (312). Then, the OFDMA symbols are transmitted to the receiver through digital-to-analog conversion and frequency uplink conversion (314). Other user is allocated with available subcarriers among the remaining M-N number of subcarriers. On the other hand, the OFDMA receiver includes an RF/ADC (analog to digital converter) module 316, a serial-to-parallel converter 318, a Remove CP module 320, an M-point discrete Fourier transform (DFT) module 322, a subcarrier demapping/equalization module 324, a parallel-to-digital converter 328, and a detection module 330. A signal processing procedure of the OFDMA receiver will be configured in reverse order of the OFDMA transmitter.

Meanwhile, as compared with the OFDMA transmitter, the SC-FDMA transmitter additionally includes an N-point DFT module 304 prior to the subcarrier mapping module 306. The SC-FDMA transmitter can reduce a peak-to-average power ratio (PAPR) of a transmitting signal more remarkably than the OFDMA transmitter by spreading a plurality of data to the frequency domain through DFT prior to IDFT processing. Also, as compared with the OFDMA receiver, the SC-FDMA receiver additionally includes an N-point IDFT module 326 after the subcarrier demapping module 324. A signal processing procedure of the SC-FDMA receiver will be configured in reverse order of the SC-FDMA transmitter.

Figure 4:
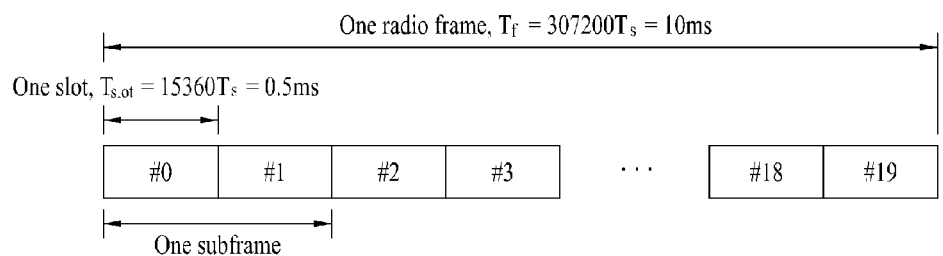
FIG. 4 is a diagram illustrating a structure of a radio frame used in a Long Term Evolution (LTE) system.

The modules illustrated in FIG. 4 are illustrative, and the transmitter and/or the receiver may further include necessary modules. Some modules/functions may be omitted or may be divided into different modules, and two or more modules may be incorporated into one module. A structure of a radio frame will now be described.

FIG. 4 is a diagram illustrating a structure of a radio frame used in the LTE system.

Referring to FIG. 4, the radio frame has a length of 10 ms (327200*$T_s$) and includes 10 subframes of an equal size. Each sub frame has a length of 1 ms and includes two slots. Each slot has a length of 0.5 ms (15360*$T_s$). In this case, $T_s$ represents a sampling time, and is expressed by $T_s=1/(15$ kHz*$2048)=3.2552*10^{-8}$(about 33 ns). The slot includes a plurality of OFDM symbols in a time domain, and includes a plurality of resource blocks (RBs) in a frequency domain. In the LTE system, one resource block includes twelve (12) subcarriers*seven (or six) OFDM symbols. A transmission time interval (TTI) which is a transmission unit time of data can be determined in a unit of one or more subframes. The aforementioned structure of the radio frame is only exemplary, and various modifications can be made in the number of subframes included in the radio frame or the number of slots included in the subframe, or the number of OFDM symbols included in the slot.

FIG. 5 is a diagram illustrating an example of communication under a single component carrier. The FDD scheme may carry out data transmission/reception through a single downlink band and a single uplink band corresponding thereto. In more detail, in accordance with the FDD scheme, the radio frame structure of FIG. 4 is used only for downlink or uplink transmission. On the other hand, the TDD scheme divides the same frequency band into a downlink interval and an uplink interval in a time domain, such that it performs data transmission/reception using the downlink interval and the uplink interval. In more detail, in the TDD scheme, the radio frame structure of FIG. 4 is classified into a downlink transmission part and an uplink transmission part. FIG. 5 may correspond to an exemplary communication of the LTE system.

Next, a method for performing a Hybrid Automatic Repeat and request (HARM) procedure by the UE will hereinafter be described with reference to FIG. 5. In the LTE system, control information (e.g., scheduling information) for downlink data transmission of a BS may be transferred to the UE over a downlink control channel established in a control region of a downlink subframe. The downlink control channel may include a Physical Downlink Control Channel (PDCCH). The UE may receive scheduling information (e.g., resources to which data is allocated, data size, coding scheme, redundancy version, etc.) over a control channel, and may receive the scheduled data over a downlink shared channel indicated by scheduling information. The downlink shared channel may include a Physical Downlink Shared Channel (PDSCH). Subsequently, the UE may transmit reception response information (e.g., HARQ ACK/NACK information) related to downlink data to the BS over an uplink control channel established in a control region of an uplink subframe. The uplink control channel may include a Physical Uplink Control Channel (PUCCH). For convenience of description and better understanding of the present invention, the term HARQ ACK/NACK will hereinafter be referred to as ACK/NACK. The BS receives ACK/NACK information from the UE, and retransmits downlink data indicated by a NACK signal. If the BS transmits several downlink data to the UE, the HARQ procedure may be carried out on the basis of a transport block corresponding to each downlink data.

In the LTE system, PUCCH resources for transmitting ACK/NACK information may include the location of frequency-time resources (e.g., resource blocks), a cyclic shift of a sequence for frequency spreading, and a (Quasi)-orthogonal code for time spreading. The frequency spreading sequence may include a Computer Generated Constant Amplitude Zero Auto Correlation (CG-CAZAC) sequence. A (Quasi-)orthogonal code for time spreading may include a Walsh/DFT code. The PUCCH resources may be represented by a combination of the above three resources, and each PUCCH resource may be indicated by PUCCH (resources) indexes.

In the LTE system, PUCCH resources for transmitting ACK/NACK information are not pre-allocated to each UE, and several UEs contained in a cell may share several PUCCH resources at respective time points. In more detail, PUCCH resources used for the UE that transmits ACK/NACK information may correspond to a PDCCH that carries scheduling information about corresponding downlink data. In more detail, the entire region where each downlink subframe transmits a PDCCH includes a plurality of Control Channel Elements (CCEs), and the PDCCH transmitted to a UE may be composed of one or more CCEs. A UE transmits ACK/NACK information through PUCCH resources corresponding to a specific CCE (e.g., a first CCE) among CCEs constructing a PDCCH received at the UE. In the LTE system, PUCCH resource indexes can be determined by the following equation 1.

$$n^{(1)}_{PUCCH} = n_{CCE} + N^{(1)}_{PUCCH} \quad \text{Equation 1}$$

In Equation 1, $n^{(1)}_{PUCCH}$ is a PUCCH resource index, $N^{(1)}_{PUCCH}$ is a signaling value received from an upper layer, $n_{CCE}$ is the smallest CCE index among CCE indexes used for PDCCH transmission, and it is assumed that $n^{(1)}_{PUCCH}$ is set to 0 for convenience of description.

FIG. 6 is a conceptual diagram illustrating the relationship between a Physical Uplink Control CHannel (PUCCH) and a Physical Downlink Control CHannel (PDCCH) for ACK/NACK transmission. Referring to FIG. 6, each square in a downlink component carrier (DL CC) indicates a CCE, and each square in an uplink component carrier (UL CC) indicates PUCCH resources. Each PUCCH index may correspond to PUCCH resources for transmitting ACK/NACK information. If it is assumed that PDSCH information is transferred over a PDCCH composed of fourth to sixth CCEs (i.e., Nos. 4 to 6 CCEs) as shown in FIG. 6, the UE transmits ACK/NACK information over the fourth PUCCH corresponding to the 4-numbered CCE serving as a first CCE of the PDCCH. FIG. 6 shows an exemplary case in which a maximum of M PUCCHs for ACK/NACK information are present in the UL CC when a maximum of N CCEs are present in the DL CC. System may be configured as N=M, but M and N may have different values, and CCEs and PUCCHs may overlap with one another in their mapping process as necessary.

Figure 7:
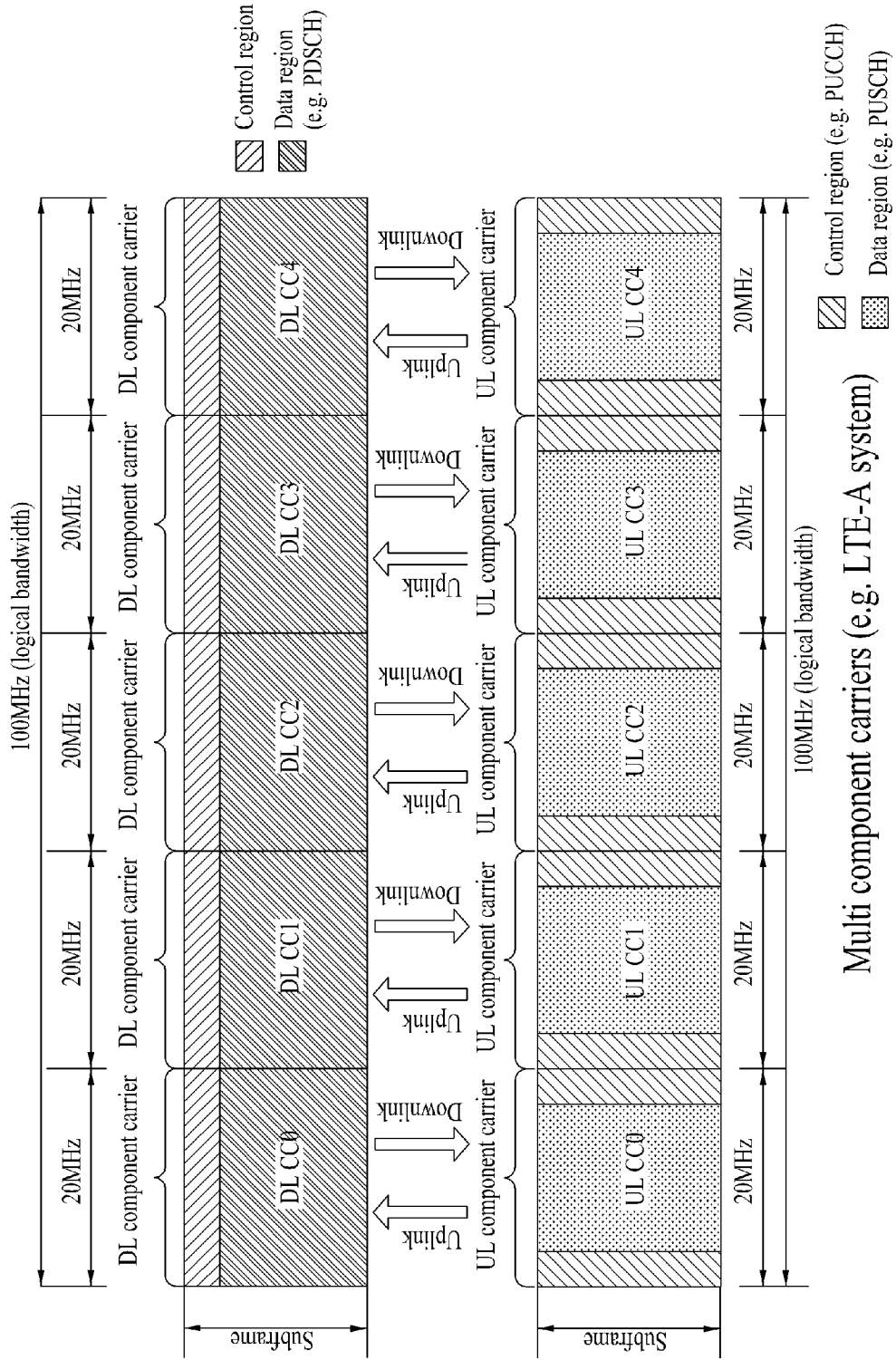
FIG. 7 is a diagram illustrating an example of communication under a plurality of component carriers.

FIG. 7 shows an example of communication under a multi-component carrier situation. FIG. 7 may correspond to an example of communication for use in the LTE-A system. The LTE system uses a carrier aggregation (or a bandwidth aggregation) technology so as to utilize a wider frequency band, wherein the carrier aggregation technology collects several uplink/downlink (UL/DL) frequency blocks and uses a larger uplink/downlink (UL/DL) bandwidths. Respective frequency blocks are transferred using Component Carriers (CCs). The term CC may indicate a frequency block for carrier aggregation or a center carrier of the frequency block, and may also indicate a combination thereof.

Referring to FIG. 7, five 20 MHz-CCs are collected in each of a downlink and an uplink so as to support a 100 MHz bandwidth. CCs may neighbor with each other or may not neighbor with each other. The radio frame structure exemplified in FIG. 4 can be applied to a situation of multi component carriers in a same way. Only, the radio frame, the subframe and the slot are time units, and so for example the base station and the user equipment can transmit/receive signals through a plurality of component carriers in one subframe. For convenience of description, FIG. 7 shows an exemplary case wherein a bandwidth of the UL CC is identical and symmetrical to that of the DL CC. However, the bandwidth of each CC may be independently determined. For example, the bandwidth of the UL CC may be represented by 5 MHz(UL CC0)+20 MHz(UL CC1)+20 MHz(UL CC2)+20 MHz(UL CC3)+5 MHz(UL CC4). In addition, it may also be possible to carry out asymmetrical carrier aggregation where the number of UL CCs is different from the number of DL CCs. Asymmetrical carrier aggregation may be generated due to the limitation of available frequency band, or may be artificially constructed by the network setup. Although FIG. 7 shows that an uplink (UL) signal and a downlink (DL) signal are transmitted through one-to-one mapped CC, a CC where a signal is actually transmitted may be changed to another CC according to a network setup or signal categories. For example, a CC for scheduling command transmission may be different from a CC for data transmission in response to a scheduling command. In addition, UL/DL control information may be transmitted over a specific UL/DL CC irrespective of the presence or absence of mapping between CCs.

In the meantime, although the entire band of a system is composed of N CCs, a frequency band that can be received at a specific UE may be limited to M CCs (where M<N). Various parameters in relation to carrier aggregation may be established according to any of a cell-specific scheme, a UE group-specific scheme, or a UE specific scheme. Accordingly, when N CCs are present in the cell, the UE can receive a PDSCH through all N CCs, but a base station (BS) may also limit the number of CCs capable of enabling the UE to receive the PDSCH to M (where M<N) according to the semi-static scheme. Next, although it is assumed that the following embodiments of the present invention can be applied to N CCs for convenience of description, it is obvious to those skilled in the art that the embodiments of the present invention are also applied to M CCs. In addition, N CCs (or M CCs) allocated to the UE are divided into L CC groups, and the following embodiments may also be applied to each CC group.

In the following embodiments, in the case where the UE simultaneously (e.g., at the same subframe) receives a plurality of PDSCHs over one or more DL CCs, ACK/NACK information related to several PDSCHs may be transferred over a single uplink physical channel (e.g., PUCCH, PUSCH, etc.). In other words, it is possible to transmit only one multiplexed ACK/NACK information to several PDSCHs. For example, the following three schemes, i.e., ACK/NACK bundling, PUCCH selection, and several ACK/NACK transmission actions, may be used.

The first scheme indicating the ACK/NACK bundling will hereinafter be described. In accordance with the ACK/NACK bundling, in case of successfully decoding all downlink data, the UE transmits one ACK over one uplink physical channel. In other cases, the UE transmits NACK information. That is, a logical AND operation is applied to decoding results of the plurality of downlink data. For example, in case of successfully decoding all PDSCHs, the UE transmits one ACK information over one PUCCH. In other cases, the UE transmits NACK information.

The second scheme indicating the PUCCH selection will hereinafter be described. In accordance with the PUCCH selection, in case of receiving a plurality of downlink data, the UE can reserve a plurality of uplink physical channels for transmitting ACK/NACK information. For example, in case of receiving a plurality of PDSCHs, the UE can reserve the same number of PUCCHs by using a specific CCE of PDCCH, which indicates each PDSCH. In this case, it is possible to transmit a plurality of ACK/NACK signals by using a combination of which PUCCH is selected for transmitting ACK/NACK information among the reserved PUCCHs and modulated/coded contents applied to the selected PUCCH.

The third scheme indicating several ACK/NACK transmission actions will hereinafter be described. In accordance with the third scheme, in the case where the UE receives a plurality of downlink data, individual ACK/NACK information for each downlink data may be transmitted over a single uplink physical channel. For example, in the case where the UE receives a plurality of PDSCHs, individual ACK/NACK information for each PDSCH may be transmitted over a single PUCCH. In particular, a plurality of ACK/NACK bits may be modulated and transmitted via one PUCCH.

In the above-mentioned schemes, resources for enabling the UE to transmit ACK/NACK information may be other resources instead of PUCCH resources. For example, in the ACK/NACK bundling and the several ACK/NACK transmission, ACK/NACK information may be transmitted via PUSCH resources. On the other hand, in the case where the UE transmits ACK/NACK information to the BS using the above-mentioned schemes, two problems may unexpectedly occur. First, if the BS transmits PDCCHs for scheduling several PDSCHs to the UE and the UE loses some PDCCHs, the UE is unable to recognize transmission of a specific PDSCH corresponding to the lost PDCCH, such that unexpected errors may occur when ACK/NACK information is generated. Second, if the UE receives PDSCHs according to a plurality of PDCCHs for PDSCH scheduling, the UE must determine which one of PDCCHs will be used to transmit ACK/NACK information over a PUCCH related to the corresponding PDCCH, and the BS also needs to recognize the determined result. The plurality of PDCCHs for PDSCH scheduling may be received over one or more DL CCs for a given time interval. The given time interval may include one or more subframes. In this case, one or more subframes may be adjacent to each other or may be spaced apart from each other. For example, in the FDD system, the plurality of PDCCHs for PDSCH scheduling may be received through one or more DL CCs at the same time (e.g., at the same subframe). In addition, in the TDD system, PDCCHs for scheduling several PDSCHs may be received through one or more DL CCs or several subframes.

A variety of schemes for solving the above-mentioned problems will hereinafter be described with reference to the annexed drawings.

Figure 13:
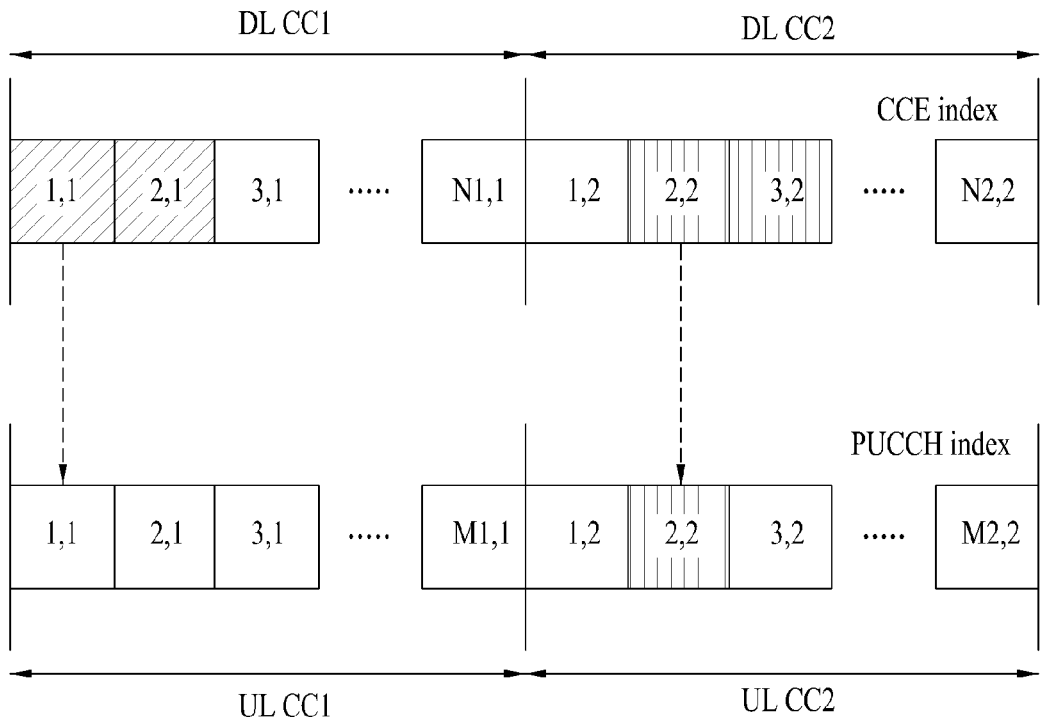
Figure 14:
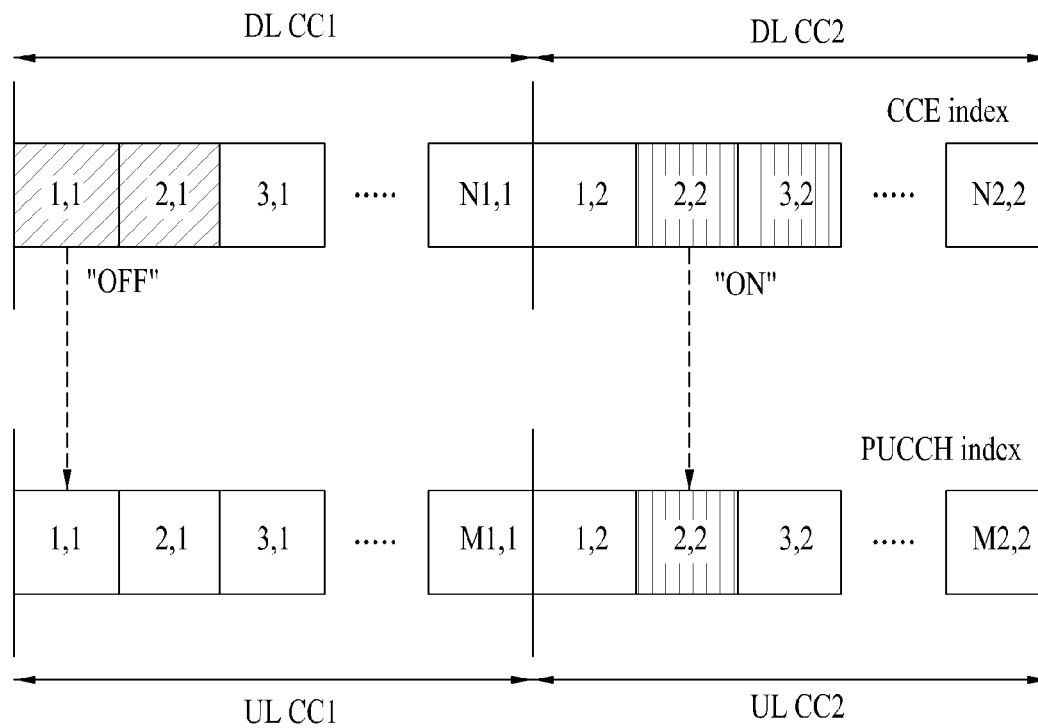

FIGS. 8 to 12 are flowcharts illustrating methods for solving ACK/NACK information errors that can be generated when the UE misses a PDCCH according to one embodiment of the present invention. FIGS. 13 to 15 are conceptual diagrams illustrating methods for determining a PUCCH to transmit ACK/NACK information when the UE receives several PDCCHs according to one embodiment of the present invention. For convenience of description, a PDCCH for scheduling a PDSCH may be referred to as simply PDCCH.

Figure 8:
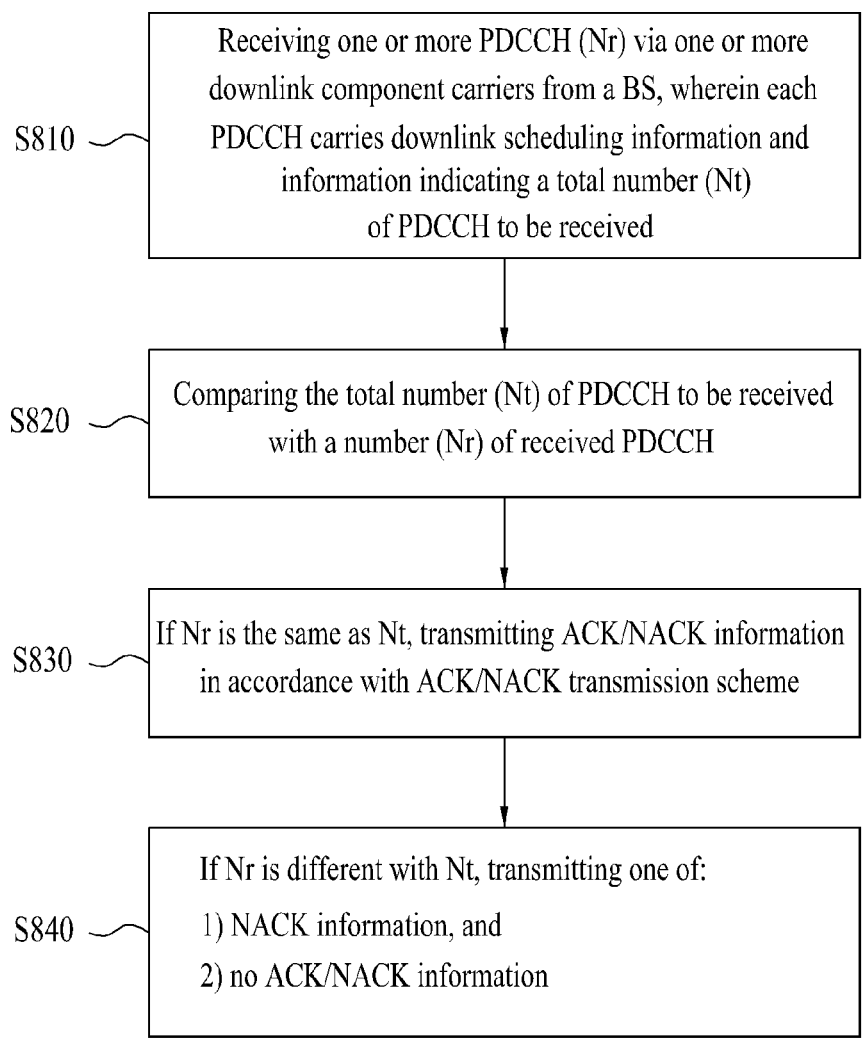
FIGS. 8 to 12 are flowcharts illustrating methods for solving ACK/NACK information errors that can be generated when a UE misses a PDCCH according to one embodiment of the present invention.

FIG. 8 is a flowchart illustrating a method for performing an HARQ procedure according to one embodiment of the present invention. The embodiment shown in FIG. 8 notifies the UE of the number of transmission PDCCHs through each PDCCH. Although FIG. 8 is illustrated in terms of the UE for convenience of description, it should be noted that the operations of FIG. 8 may be symmetrically applied to another case wherein the BS performs the HARQ procedure.

Referring to FIG. 8, the UE may receive one or more PDCCHs (Nr PDCCHs) from the BS through a downlink component carrier (DL CC) at step S10. Nr PDCCHs may be simultaneously received, for example, such Nr PDCCHs may be received at the same downlink subframe. In addition, one or more PDCCHs (i.e., Nr PDCCHs) may be received via several downlink subframes. In this case, each PDCCH may further carry not only downlink scheduling information but also information about a total number (Nt) of PDCCHs (or a total number of PDSCHs) to be received at the UE. For convenience of description, information about a total number of PDCCHs (or PDSCHs) to be simultaneously received at the UE will hereinafter be referred to as PDCCH number information. The PDCCH number information may also indicate information about a total number of PDCCHs (or PDSCHs) simultaneously transmitted to one UE by the BS. In other words, the BS may also indicate information about the number of PDCCHs (or PDSCHs) to be received at the subframe by a corresponding UE, through the PDCCH. For example, if it is assumed that the BS transmits three PDCCHs to the UE during one subframe, information about transmission of the three PDCCHs may be wholly loaded on three PDCCHs transmitted to the UE. In the meantime, if several PDSCH types are used, the PDCCH number information may not consider a specific-type PDSCH or a PDCCH for scheduling the specific-type PDSCH. For example, a specific-type PDSCH may include a semi-persistently scheduled PDSCH. In more detail, if the BS transmits two normal PDSCHs and one semi-persistently scheduled PDSCH, the PDCCH number information (indicating two PDCCHs) may be loaded only on two PDCCHs indicating the normal PDSCH. In this case, the UE may omit a specific-type PDSCH or a PDCCH for scheduling the specific-type PDSCH in a process for counting the received PDCCHs (or PDSCHs).

The PDCCH number information may be explicitly contained in the PDCCH. For example, if it is assumed that a maximum number of PDCCHs capable of being simultaneously received at the UE is set to M, each PDCCH may allow the UE to indicate the number (Nt) of PDCCHs through a field composed of ceil ($\log_2 M$) bits. Ceil( ) represents a ceiling function which rounds the specified number up and returns the smallest number that is greater than or equal to the specified number. In order to further reduce the number of bits used for such PDCCH number information, a maximum number of PDCCHs may be wrap-around using a value less than ceil ($\log_2 M$). For example, if the number of bits used for PDCCH number information is limited to 2 bits, the number PDCCHs (i.e., the PDCCH number) may be denoted by [0=>1 =>2=>3=>0=>1, . . . ]. In this case, the UE may also count the number of received PDCCHs or PDSCHs according to the wrap-around scheme using 2 bits. For another example, the PDCCH number information may be indirectly or implicitly transmitted using modification of PDCCH sequence scrambling, CRC masking, etc. In the LTE system, the PDCCH may be Cyclic Redundancy Check (CRC) masked using a Radio Network Temporary Identifier (RNTI). Therefore, in order to obtain the compatibility with the LTE system, the PDCCH may be CRC-masked using an RNTI being additionally obtained for the PDCCH number information. In addition, the PDCCH may be CRC-masked using the RNTI where the PDCCH number is applied according to a given scheme. For example, the RNTI may be multiplied by the PDCCH number information, or a predetermined offset may be applied to the RNTI. The RNTI may include a Cell-RNTI (C-RNTI), a Temporary Cell-RNTI (TC-RNTI), a Random Access-RNTI (RA-RNTI), UE group RNTI, etc.

Thereafter, the UE may compare Nt, indicating a total number of PDCCHs that must be received at the UE, with Nr indicating the number of PDCCHs having been actually received at the UE at step S820. In accordance with the embodiment of the present invention, although the UE misses even one of several PDCCHs that have been transmitted to the UE, the UE can recognize the PDCCH missing fact by referring to the number of PDCCHs loaded on other PDCCHs that have been received at the UE. Accordingly, if the total number (Nt) of PDCCHs to be received at the UE is identical to the number (Nr) of actually received PDCCHs, the UE determines that all PDCCHs transmitted from the BS have been successfully received, and transmits ACK/NACK information related to downlink data according to the ACK/NACK transmission scheme at step S830. The ACK/NACK information can be transmitted through PUCCH or PUSCH. Otherwise, if the total number (Nt) of PDCCHs to be received at the UE is different from the number (Nr) of actually received PDCCHs, the UE determines that some parts of all the PDCCHs transmitted from the BS are lost, such that it may transmit NACK information or may not transmit ACK/NACK information at step S840. In more detail, at steps S830 and S840, the UE may carry out the following operations 1) ACK/NACK bundling, 2) PUCCH selection, and 3) Several ACK/NACK transmissions according to ACK/NACK transmission schemes.

1) ACK/NACK bundling:

In the case where the number (Nt) of PDCCHs obtained by PDCCH number information is identical to the number (Nr) of actually received PDCCHs, and PDSCHs scheduled by respective PDCCHs are successfully decoded, the UE transmits an ACK signal. In other cases, the UE may transmit a NACK signal or may not transmit ACK/NACK signals. The ACK/NACK information can be transmitted through PUCCH or PUSCH.

2) PUCCH selection:

In the case where the number (Nt) of PDCCHs obtained by PDCCH number information is identical to the number (Nr) of actually received PDCCHs, the UE transmits ACK/NACK information according to the PUCCH selection scheme. In other cases, the UE may not transmit ACK/NACK information or may transmit ACK/NACK information indicating several NACK signals (e.g., Nr or Nt NACK signals).

3) Several ACK/NACK transmissions:

In the case where the number (Nt) of PDCCHs obtained by PDCCH number information is identical to the number (Nr) of actually received PDCCHs, the UE transmits ACK/NACK information according to the several ACK/NACK transmission scheme. In other cases, the UE may not transmit ACK/NACK information or may transmit several NACK signals (e.g., Nr or Nt NACK signals). The ACK/NACK information can be transmitted through PUCCH or PUSCH.

Figure 9:
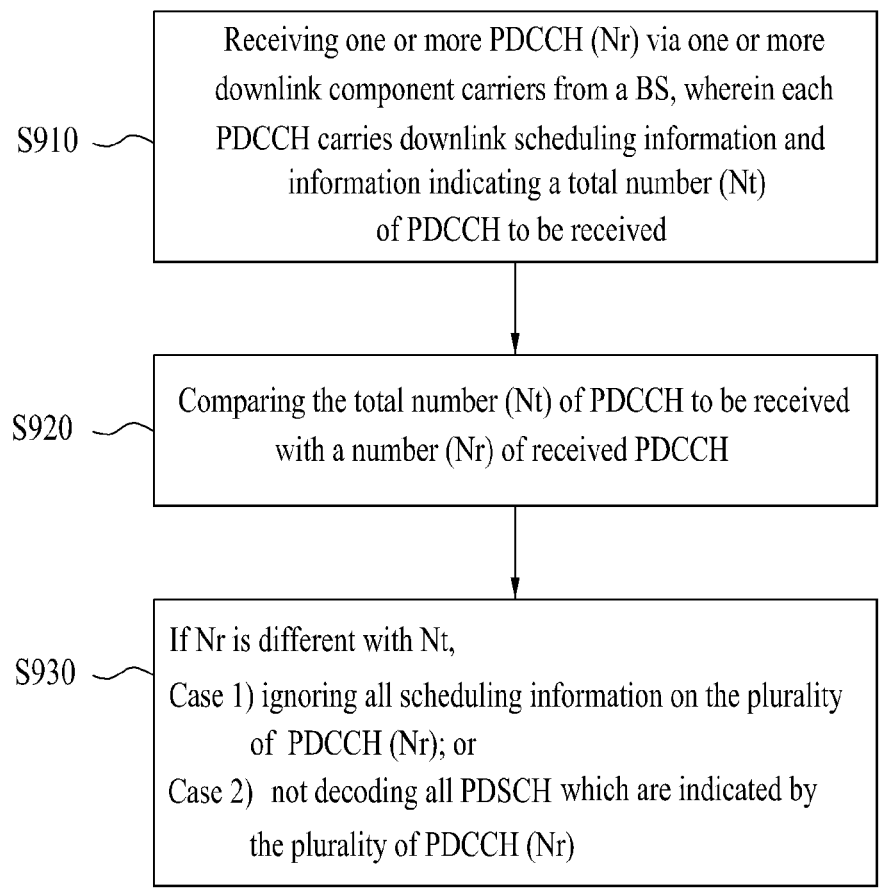

FIG. 9 is a flowchart illustrating a method for processing downlink data in the HARQ procedure shown in FIG. 8. Referring to FIG. 8, if the number (Nt) of PDCCHs obtained by PDCCH number information is different from the number (Nr) of actually received PDCCHs, the UE may transmit no ACK/NACK information, or may transmit one or more NACK signals. Consequently, in accordance with one embodiment of the present invention, if Nt is different from Nr, it is determined that downlink data transmitted from the BS to the UE has failed in transmission irrespective of whether or not the UE has successfully received the downlink data after having attempted to decode the downlink data. Accordingly, in order to reduce the decoding load of the UE, the embodiment of the present invention further provides a method for preventing the processing of downlink data that is transmitted at the same time point (e.g., TTI, subframe, etc.) when Nt is different from Nr. In more detail, as can be seen from FIG. 9, if Nt is different from Nr, the UE may discard scheduling information received over a PDCCH (S930; Case 1). In other words, although the UE can recognize the presence of scheduled PDSCH through a PDCCH, a process for receiving a corresponding PDSCH may be omitted. In more detail, the UE receives only the control region including the PDCCH, and may not receive information of the data region including the PDSCH. For another example, if Nt is different from Nr, although the UE receives the PDSCH indicated by the PDCCH, it should be noted that the decoding of a corresponding PDSCH may not be carried out (S930; Case 2).

Figure 10:
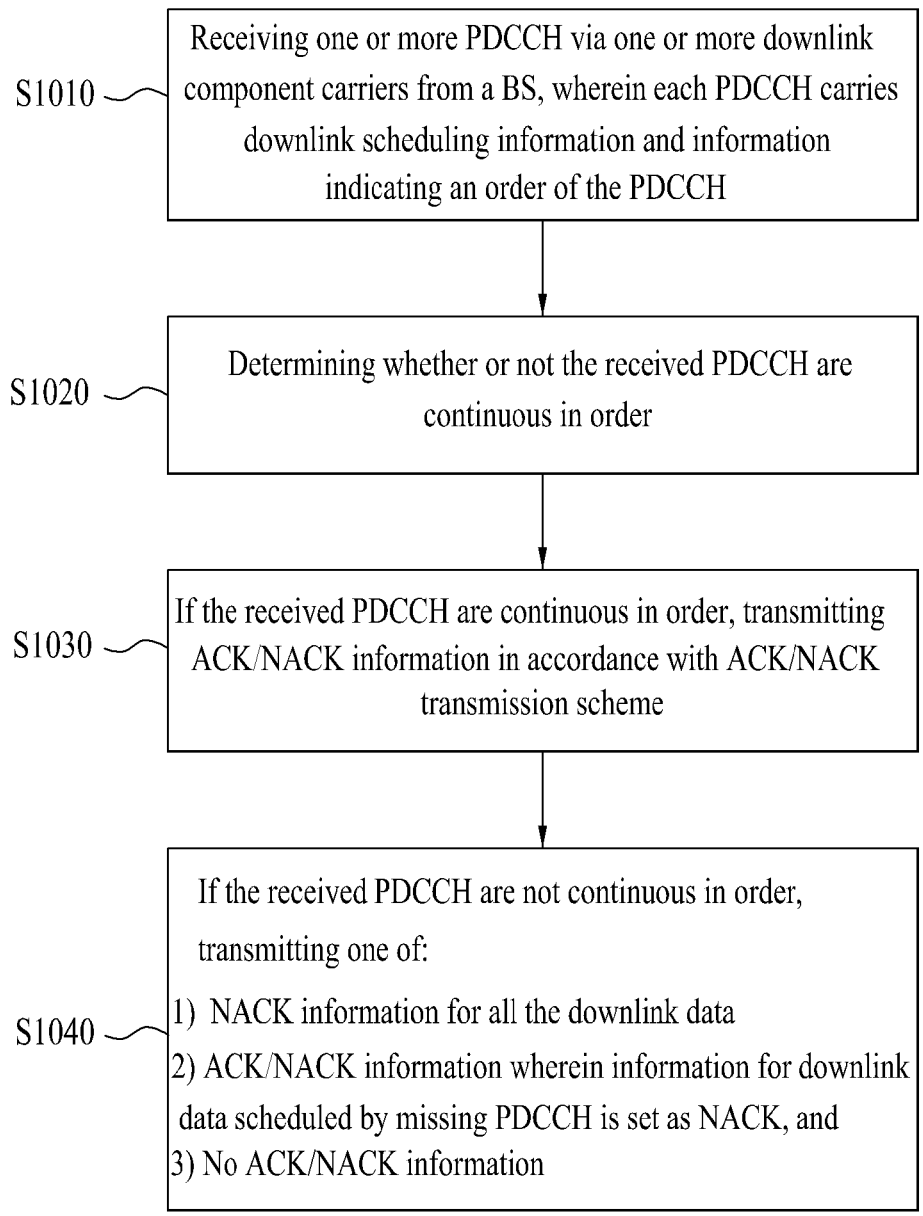

FIG. 10 is a flowchart illustrating another method for processing the HARQ procedure according to embodiments of the present invention. The embodiment shown in FIG. 10 shows an exemplary case for indicating the order value of a PDCCH transmitted to the UE over each PDCCH. Although the method shown in FIG. 10 is illustrated on the basis of only the UE, this method may also be symmetrically applied to the HARQ procedure based on the BS.

Referring to FIG. 10, the UE may receive one or more PDCCHs from the BS over a downlink component carrier (DL CC) at step S1010. One or more PDCCHs may be simultaneously received at the UE, for example, may be received at the UE at the same downlink subframe. Also, one or more PDCCHs (Nr PDCCHs) may be received at the UE through several downlink subframes. In this case, each PDCCH may further carry not only downlink scheduling information but also information about the order of PDCCH (or PDSCH) that must be received at the UE. For convenience of description, information about the order of total PDCCHs that must be simultaneously received at the UE is referred to as PDCCH order information. The PDCCH order information may also indicate information about the order of total PDCCHs (or total PDSCHs) simultaneously transmitted from a BS to one UE. That is, the BS may inform a corresponding UE of information about the order of each PDCCH (or PDSCH) when one or more PDCCHs are transmitted to a predetermined UE during a single subframe. For example, if the BS transmits three PDCCHs to one UE during one subframe, it may respectively transmit values of 0, 1, and 2 (or 1, 2, and 3) to the UE over three PDCCHs. In this case, the PDCCH order information may be determined using a DL CC index, a frequency order of a DL CC, a CCE index, etc. For example, in the same DL CC, the PDCCH order may be determined to be the size of CCE indexes constructing a PDCCH. In different DL CCs, the PDCCH order may be determine to be the frequency order of DL CCs. The PDCCH order information may be explicitly contained in the PDCCH. For example, if it is assumed that a maximum number of PDCCHs capable of being simultaneously received at the UE is set to M, each PDCCH may enable the UE to indicate the PDCCH order using a field composed of ceil ($\log_2 M$) bits. In addition, the PDCCH order information may be denoted by a bitmap wherein each bit indicates the PDCCH order. For another example, the PDCCH order information may be indirectly transmitted by changing PDCCH scrambling or CRC masking. The PDCCH may be CRC-masked using the RNTI additionally obtained for the PDCCH order information. Also, the PDCCH may be CRC-masked using the RNTI where the PDCCH order is applied using a predetermined scheme. For example, the RNTI may be multiplied by the PDCCH order, or a predetermined offset may be applied to the RNTI according to the PDCCH order.

After that, the UE may determine whether or not the received PDCCHs are contiguous in order at step S1020. In accordance with one embodiment, if the received PDCCHs are not contiguous in order at step S1020, it can be recognized that some PDCCHs are lost. For example, provided that the 0-numbered PDCCH and the 2-numbered PDCCH are received at one subframe, the UE can recognize that a 1-numbered PDCCH and a counterpart PDSCH were missed or lost. However, a method according to one embodiment has difficulty in recognizing whether or not PDCCHs located after the contiguously-numbered PDCCHs missed or lost. Anyway, if the received PDCCHs are contiguous in order, it is assumed that the UE has successfully received all PDCCHs from the BS, and the UE transmits ACK/NACK information related to downlink data according to the ACK/NACK transmission scheme at step S1030. The ACK/NACK information can be transmitted through PUCCH or PUSCH. In the meantime, if the received PDCCHs are not continuous in order, the UE determines that some PDCCHs missed, such that the UE may transmit NACK information or no ACK/NACK information at step S1040. In more detail, at steps S1030 and S1040, the UE may carry out the following operations 1) ACK/NACK bundling, 2) PUCCH selection, and 3) Several ACK/NACK transmissions according to ACK/NACK transmission schemes.

1) ACK/NACK bundling:

In the case where the received PDCCHs are not contiguous in order, the UE may transmit NACK information or no ACK/NACK information. In other cases, the UE may transmit ACK/NACK information according to the conventional ACK/NACK bundling scheme. The ACK/NACK information can be transmitted through PUCCH or PUSCH.

2) PUCCH selection:

In the case where the received PDCCHs are not contiguous in order, the UE may transmit ACK/NACK information indicating several NACK signals or may transmit no ACK/NACK information. Preferably, reception response information about downlink data corresponding to the missed PDCCH may be set to NACK information by the UE. In other cases, it may be possible to transmit ACK/NACK information according to the conventional PUCCH selection scheme.

3) Several ACK/NACK transmissions:

In the case where the received PDCCHs are not continuous in order, the UE may transmit no ACK/NACK information or may transmit several NACK signals. Preferably, reception response information about downlink data corresponding to the missed PDCCH may be set to NACK information by the UE. In other cases, it may be possible to transmit ACK/NACK information according to the conventional several ACK/NACK transmission scheme. The ACK/NACK information can be transmitted through PUCCH or PUSCH.

Figure 11:
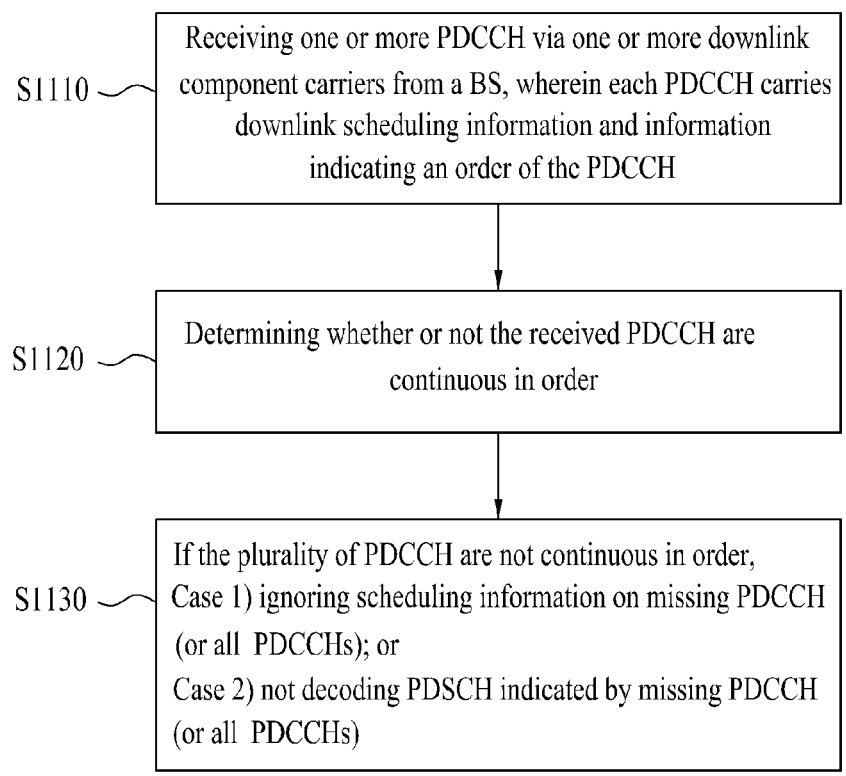

FIG. 11 is a flowchart illustrating a method for processing downlink data in the HARQ procedure shown in FIG. 10. Referring to FIG. 10, if the received PDCCHs are not contiguous in order, the UE may not transmit the ACK/NACK signal, or may transmit (several) NACK signals. Consequently, in accordance with one embodiment of the present invention, if the received PDCCHs are not contiguous in order, it is determined that downlink data transmitted from the BS to the UE has failed in transmission irrespective of whether or not the UE has successfully received the downlink data after having attempted to decode the downlink data. Accordingly, in order to reduce the decoding load of the UE, the embodiment of the present invention further provides a method for preventing the processing of downlink data that is transmitted at the same time point (e.g., TTI, subframe, etc.) when the PDCCHs are not contiguous in order. In more detail, as can be seen from FIG. 11, if the PDCCHs are not contiguous in order, the UE may discard scheduling information received over PDCCHs (S1130; Case 1). In other words, although the UE can recognize the presence of scheduled PDSCH through the PDCCH, a process for receiving a corresponding PDSCH may be omitted. In more detail, the UE receives only the control region including the PDCCH, and may not receive information of the data region including the PDSCH. For another example, if the PDCCHs are not contiguous in order, although the UE receives the PDSCH indicated by the PDCCH, it should be noted that the decoding of a corresponding PDSCH may not be carried out (S1130; Case 2).

Figure 12:
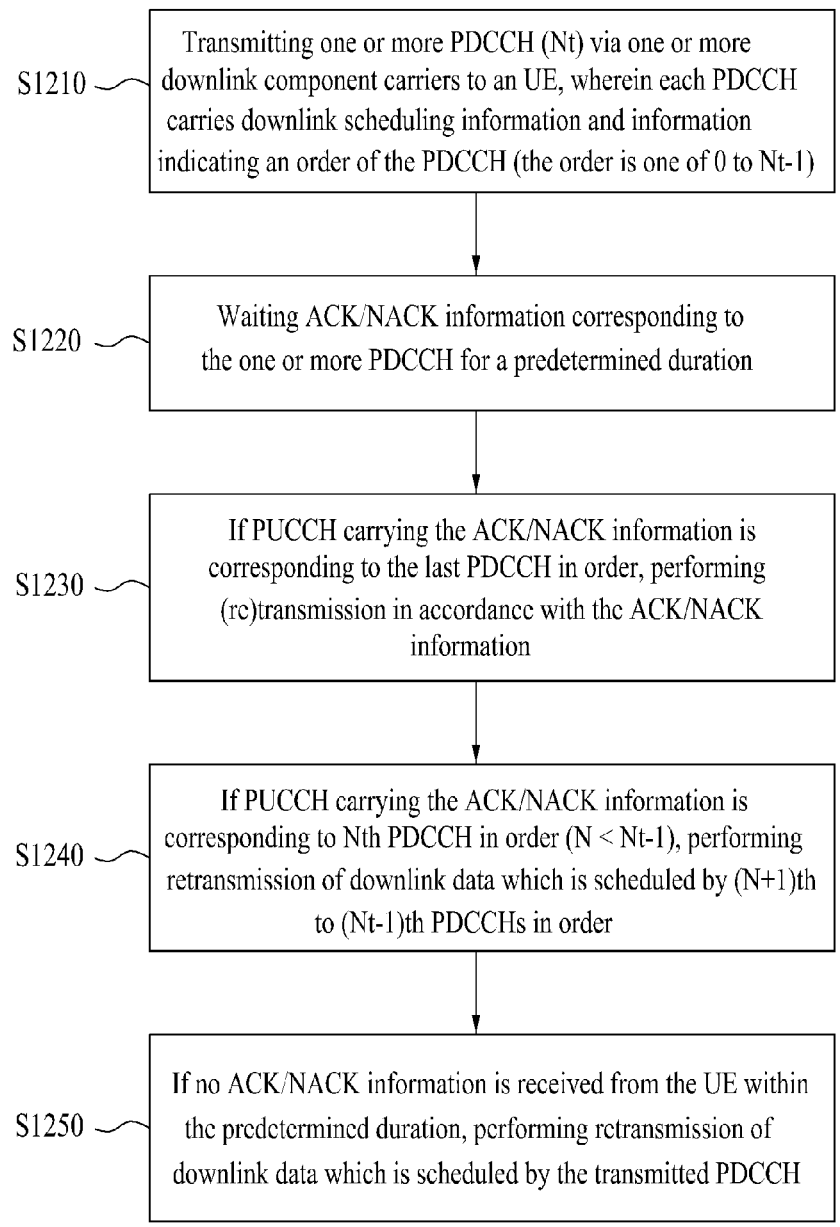

FIG. 12 is a flowchart illustrating a method for performing the HARQ procedure by the BS in association with the embodiment of FIG. 10.

Referring to FIG. 12, the BS may transmit one or more PDCCHs (Nt PDCCHs) to the UE over a downlink component carrier (DL CC) at step S1210. Nt PDCCHs may be simultaneously transmitted, for example, may be transmitted to the same downlink subframe. In addition, one or more PDCCHs (Nt PDCCHs) may be transmitted over a plurality of downlink subframes. In this case, each PDCCH may further carry not only downlink scheduling information but also information about the PDCCH order (or the PDSCH order) to be received at the UE. Detailed description of The PDCCH order information is the same as in FIG. 10. In this embodiment, it is assumed that the PDCCH order value is set to any of 0 to Nt-1. After that, the BS may wait for ACK/NACK information corresponding to the one or more PDCCHs during a predetermined time period at step S1220. If the BS receives a PUCCH that carries ACK/NACK information from the UE during a predetermined time period, it determines which one of PDCCHs (not shown) corresponds to the PUCCH carrying the ACK/NACK information. In the embodiment, it is assumed that the UE transmits ACK/NACK information over a PUCCH corresponding to a PDCCH having the highest order among PDCCHs that are contiguous in order.

If the PUCCH carrying ACK/NACK information corresponds to the last PDCCH, the BS may perform retransmission or new transmission in response to the ACK/NACK information. However, if the PUCCH carrying ACK/NACK information corresponds to the N-th PDCCH (where N<Nt-1) in order, the BS may retransmit downlink data having been scheduled by the (N+1)-th to (Nt-1)-th PDCCHs at step S1240. The PDCCH order may be directly or indirectly recognized on the basis of the PUCCH. For example, the PUCCH may directly include information indicating the highest order value among PDCCH order values corresponding to ACK/NACK information. For another example, information indicating the highest order value among PDCCH order values corresponding to the ACK/NACK information may be indirectly indicated by either UL CC where the PUCCH is transmitted or PUCCH resources. Although it is assumed steps S1230 to S1240 receive ACK/NACK information over the PUCCH and recognize the PDCCH order value on the basis of a corresponding PUCCH, the embodiments of the present invention may also be applied to another case in which the BS receives ACK/NACK information over other resources or other physical channel. For example, the embodiment of the present invention may also be applied to the case in which the UE receives ACK/NACK information over the PUSCH. In the meantime, if the BS may not receive ACK/NACK information from the UE during a predetermined time period, it may retransmit all downlink data scheduled by the PDCCH shown in the above step S1210 (S1240).

A method for determining a PUCCH that will transmit ACK/NACK information when the UE receives PDSCHs using several PDCCHs according to one embodiment of the present invention will hereinafter be described with reference to FIGS. 13 to 15.

For convenience of description, although FIGS. 13 to 15 assume that each of UL/DL bands is composed of CCs being contiguous in a frequency domain, this assumption is disclosed only for illustrative purposes, and each of the UL/DL bands may be independently established or be composed of contiguous/non-continuous CCs. In addition, although FIGS. 13 to 15 assume symmetrical carrier aggregation, this assumption is disclosed only for illustrative purposes, it should be noted that the embodiment of the present invention may also be applied to asymmetrical carrier aggregation wherein the number of DL CCs is different from the number of UL CCs.

In addition, although FIGS. 13 to 15 assume that the mapping relationship between the DL CC and the UL CC having the same index in relation to ACK/NACK information is established, this assumption is disclosed only for illustrative purposes, and the mapping relationship between the DL CC and the UL CC may be changed with time. For example, the mapping relationship between the DL CC and the UL CC may be statically, semi-statically, or dynamically signaled. In addition, although FIG. 13 assumes that respective DL CCs have the same number of CCEs, and respective UL CCs have the same number of PUCCH resources, this assumption is disclosed only for illustrative purposes, and it should be noted that the number of CCEs and the number of PUCCH resources may be independently established in respective CC in consideration of the bandwidth of each CC, network setup information, etc. Although FIGS. 13 to 15 exemplarily show that several PDCCHs are received over several DL CCs, the embodiment of the present invention may be equally applied even to a case wherein several PDCCHs are received over one DL CC. In addition, in the case of asymmetrical carrier aggregation in which several DL CCs are mapped to one UL CC, a PUCCH corresponding CCEs contained in several DL CCs or a combination of {CCEs contained in several DL CCs and a DL subframe} can be defined in one UL CC.

FIG. 13 is a conceptual diagram illustrating a method for determining a PUCCH that will transmit ACK/NACK information according to one embodiment of the present invention. FIG. 13 shows an exemplary case for transmitting ACK/NACK information corresponding to a specific PDCCH when PDSCHs are received using several PDCCHs. For example, if the UE receives several PDSCHs using several PDCCHs at the same time (e.g., TTI or subframe), it can transmit ACK/NACK information over a PUCCH corresponding to the first or last one among the received PDCCHs. The PDCCH sequence may be established in various ways using a CCE index, a DL CC index, a DL CC frequency order, etc. For example, the PDCCH order may be determined to be the size of a CCE index constructing such a PDCCH within the same DL CC. In this case, the CCE index may be the lowest or highest value among CCEs constructing the PDCCH. In addition, the PDCCH order may be determined to be the DL CC index or DL CC frequency order in association with difference DL CCs.

In more detail, FIG. 13 shows an example in which a cell includes two DL CCs and two counterpart UL CCs. It is assumed that the entire PDCCH region of a DL CC1 includes N1 CCEs ($CCE_{1,1} \sim CCE_{N1,1}$), and the entire PDCCH region of a DL CC2 includes N2 CCEs ($CCE_{1,2} \sim CCE_{N2,2}$).

In $CCE_{X,Y}$, X is a CCE index in a DC CC, and Y is a DL CC index. In addition, it is assumed that the UL CC1 includes a total of M1 ACK/NACK transmission PUCCHs ($PUCCH_{1,1} \sim PUCCH_{M1,1}$), the UL CC2 includes a total of M2 ACK/NACK transmission PUCCHs ($PUCCH_{1,2} \sim PUCCH_{M1,2}$). In $PUCCH_{X,Y}$, X is a PUCCH (resource) index in a UL CC, and Y is a DL CC index. Under this condition, the BS schedules a PDSCH for a DL CC1 to the UE over a PDCCH composed of $CCE_{1,1}$ and $CCE_{2,1}$, and schedules a PDSCH for a DL CC2 to the UE over a PDCCH composed of $CCE_{2,2}$ and $CCE_{3,2}$. In this case, the UE may transmit ACK/NACK information over a PUCCH corresponding to a specific CCE (e.g., a first CCE) that has received over a DL CC2 corresponding to the last one of two PDCCHs.

Particularly, if the above-mentioned scheme for transmitting ACK/NACK information over a PUCCH corresponding to the last PDCCH is combined with a method for indicating the order value of a corresponding PDCCH over each PDCCH, the availability of the aforementioned scheme may be increased more. For example, in the embodiments of FIGS. 10 to 12, it is assumed that the UE receives three PDCCHs and reads the order values 0, 1 and 2 over respective PDCCHs. In this case, since the received PDCCHs are contiguous in order, the UE determines the PDCCHs have been successfully received. However, it is assumed that the BS transmits four PDCCHs (e.g., PDCCH order value 0 to 3), and the UE misses a third PDCCH among the four PDCCHs. In this case, since the received PDCCHs are contiguous in order, the UE is unable to recognize the missing of the third PDCCH. In this case, if the UE transmits ACK/NACK information over a PUCCH corresponding to the last one (i.e., a second PDCCH (2-numbered PDCCH)) of the received PDCCHs, the BS can recognize the missing of the third PDCCH. Therefore, the BS can retransmit the scheduled PDSCH over the third PDCCH. Although the above-mentioned example shows the exemplary case where the UE missed the last PDCCH, it can be recognized that the above-mentioned case may be equally applied to another case in which the UE misses several contiguous PDCCHs starting from the last PDCCH. For example, the above-mentioned embodiment may also be applied to another case in which the BS transmits five PDCCHs (e.g., the PDCCH order values of 0 to 4) and misses fourth and fifth PDCCHs (Nos. 4 and 5 PDCCHs) among the five PDCCHs.

FIG. 14 shows another example for determining a PUCCH that will transmit ACK/NACK information according to an embodiment of the present invention. FIG. 14 shows an exemplary case for transmitting information through each PDCCH when PDSCHs are received over several PDCCHs, wherein the information notifies whether PUCCH resources for transmitting ACK/NACK information are determined using a corresponding PDCCH. For convenience of description, the information for notifying whether PUCCH resources for transmitting ACK/NACK information are determined using the corresponding PDCCH is referred to as PUCCH allocation information. PUCCH allocation information may be one bit (1 bit) information denoted by two states (i.e., ON and OFF states). PUCCH allocation information may be explicitly or implicitly signaled. For example, PUCCH allocation information may be directly included in PDCCH information. In addition, the PUCCH allocation information may be signaled by CRC-masking of a PDCCH or scrambling of a PDCCH sequence.

Referring to FIG. 14, when the BS schedules several PDSCHs to the UE over several PDCCHs, the BS can transmit ON information to one PDCCH and transmit OFF information to other PDCCHs. In this case, the UE can transmit ACK/NACK information over a PUCCH corresponding to a PDCCH where PUCCH information indicates the ON state. In addition, the BS may transmit ON information to several PDCCHs. In this case, the UE can transmit ACK/NACK information over several PUCCHs corresponding to PDCCHs where PUCCH allocation information corresponds to the ON status. In addition, the UE can transmit ACK/NACK information over PUCCHs corresponding to some PDCCHs among several PDCCHs where PUCCH allocation information indicates the ON state. For example, a specific PDCCH is selected from among several PDCCHs where PUCCH allocation information indicates the ON state according to a predetermined rule (e.g., a first or last PDCCH), and ACK/NACK information can be transmitted over a PUCCH corresponding to the specific PDCCH. In addition, a specific PDCCH can be selected at random from among several PDCCHs where PUCCH allocation information indicates the ON state, and ACK/NACK information can be transmitted over a PUCCH corresponding to the specific PDCCH.

FIG. 15 shows another example for determining a PUCCH that will transmit ACK/NACK information according to an embodiment of the present invention. FIG. 15 shows an exemplary case in which ACK/NACK information is transmitted over a specific UL CC only. The embodiment shown in FIG. 15 may be considered to be an exemplary case in which several DL CCs are mapped to one UL CC in association with ACK/NACK information. In association with ACK/NACK information, a specific UL CC may be mapped to a full downlink band or a DL CC group. The full downlink band includes one or more DL CC groups, each of which includes one or more DL CCs. Accordingly, in the case where the PDCCH is received over several DL CCs irrespective of a general mapping relationship between the DL CC and the UL CC, ACK/NACK information for a corresponding PDCCH can be transmitted over a specific UL CC only. For example, ACK/NACK information may be established and/or signaled such that the ACK/NACK information can be transmitted over only a specific PUCCH of a specific UL CC. For another example, ACK/NACK information may be established and/or signaled such that the ACK/NACK information can be transmitted over a PUCCH corresponding to a specific CCE of a specific DL CC. In this case, the UE may be established/signaled to transmit ACK/NACK information over a PUCCH corresponding to a specific CCE among CCEs that must be monitored by each UE for PDCCH reception within a specific DL CC. A specific PUCCH, a specific DL CC, and a specific CCE may be changed with time.

A specific DL CC and/or a specific CCE may be explicitly signaled. For example, information for indicating a specific DL CC and/or a specific CCE may be directly signaled over system information or an RRC message. In the meantime, a specific DL CC and/or a specific CCE may be established according to a predetermined rule or may be implicitly signaled. For example, a specific DL CC may be determined using a UE identifier (ID) and parameters (e.g., a band, index, etc.) related to a DL CC. In addition, a specific CCE may be a CCE (e.g., a first or last CCE) located at a specific position in a PDCCH search space (or PDCCH) for a corresponding UE within a specific DL CC. In this case, the UE may transmit ACK/NACK information over a PUCCH corresponding to a specific CCE among CCEs that must be monitored by each UE for PDCCH reception within a specific DL CC. In addition, in the case where the BS transmits PDCCH/PDSCH information to the UE over several DL CCs, the specific DL CC can always be contained the PDCCH/PDSCH information. In this case, the UE can always transmit ACK/NACK information over a PUCCH corresponding to a PDCCH received over a specific DL CC.

FIG. 15 shows an exemplary case in which ACK/NACK information is transmitted over only the UL CC1 when the PDCCH is received over the DL CC1 and/or the DL CC2. In FIG. 15, it is assumed that a specific PUCCH is $PUCCH_{3,1}$. $PUCCH_{3,1}$ may be directly indicated, or be indirectly indicated through a specific CCE of the DL CC1. The specific CCE may be one of CCEs contained in the PDCCH search space of the DL CC1. The PDCCH search space may indicate one or more CCEs that must be monitored by each UE for PDCCH reception. Therefore, in the case of receiving a PDCCH over the DL CC2 not mapped to the UL CC1, the UE may transmit ACK/NACK information over $PUCCH_{3,1}$ of the UL CC1 (See FIG. 15(a)). In the meantime, in the case of receiving a PDCCH over a DL CC1 mapped to a specific UL CC, the UE may transmit ACK/NACK information over a PUCCH corresponding to a specific CCE (not shown), or may transmit ACK/NACK information over a PUCCH (i.e., $PUCCH_{1,1}$) corresponding to the actually received PUCCH (See FIG. 15(b)).

FIG. 16 is a block diagram illustrating a BS and a UE applicable to embodiments of the present invention.

Referring to FIG. 16, a wireless communication system includes a BS110 and a UE 120. In downlink, a transmitter may be a part of the BS110, and a receiver may be a part of the UE 120. In uplink, a transmitter may be a part of the UE 120, and a receiver may be a part of the BS110. The BS110 includes a processor 112, a memory 114, and a radio frequency (RF) unit 116. The processor 112 may be constructed to implement the procedures and/or methods disclosed in the embodiments of the present invention. The memory 114 may be connected to a processor 112, and store various information related to operations of the processor 112. The RF unit 116 is connected to the processor 112, and transmits and/or receives RF signals. The UE 120 includes a processor 122, a memory 124, and an RF unit 126. The processor 122 may be constructed to implement the procedures and/or methods disclosed in the embodiments of the present invention. The memory 124 may be connected to a processor 122, and store various information related to operations of the processor 122. The RF unit 126 is connected to the processor 122, and transmits and/or receives RF signals. The BS110 and/or the UE 120 may include a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. Software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

Exemplary embodiments of the present invention can be applied to a wireless communication system. In more detail, the exemplary embodiments of the present invention can be applied to a method and apparatus for signaling uplink ACK/NACK information in a carrier aggregation environment.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for performing a hybrid automatic repeat and request (HARQ) procedure by a user equipment (UE) in a wireless communication system, the method comprising:
   receiving one or more control channels carrying downlink scheduling information from a base station (BS),
   wherein each control channel carries specific information indicating a total number of control channels transmitted from the BS to the UE;
   determining whether the total number of control channels transmitted to the UE is identical to the number of control channels received at the UE; and
   transmitting infomation based on whether the total number of control channels transmitted to the UE is identical to the number of control channels received at the UE.

2. The method according to claim 1, wherein the control channel includes a physical downlink control channel (PDCCH).

3. The method according to claim 1, wherein the one or more control channels are simultaneously received.

4. The method according to claim 1, further comprising:
   omitting a process for transmitting acknowledgement/negative acknowledgement (ACK/NACK) information to the BS, if the total number of control channels transmitted to the UE is different from the number of control channels received at the UE.

5. The method according to claim 1, wherein the step of transmitting comprises:
   transmitting NACK information to the BS, if the total number of control channels transmitted to the UE is different from the number of control channels received at the UE.

6. A method for performing a hybrid automatic repeat and request (HARQ) procedure by a user equipment (UE) in a wireless communication system, the method comprising:
   receiving one or more downlink control channels carrying downlink scheduling information from a base station (BS),
   wherein each downlink control channel carries information indicating an order value of each downlink control channel within a plurality of downlink control channels transmitted from the BS to the UE;
   determining whether or not the one or more downlink control channels received from the BS are contiguous in order; and
   transmitting information based on whether or not the one or more downlink control channels received from the BS are contiguous in order.

7. The method according to claim 6, wherein the one or more downlink control channels are simultaneously received.

8. The method according to claim 6, further comprising:
   omitting a process for transmitting acknowledgement/negative acknowledgement (ACK/NACK) information to the BS, if order values of the received one or more control channels are not contiguous.

9. The method according to claim 6, wherein the step of transmitting comprises:
   transmitting NACK information to the BS, if order values of the received one or more control channels are not contiguous.

10. The method according to claim 6, wherein the step of transmit comprises:
    transmitting ACK/NACK information where downlink data corresponding to a downlink physical channel of a non-received order value is set to NACK information to the BS, if order values of the received one or more control channels are not contiguous.

11. The method according to claim 6, wherein the step of transmitting comprises:
    transmitting ACK/NACK information to the BS over an uplink control channel corresponding to a downlink control channel having a last order value, if order values of the received one or more control channels are not contiguous.

12. A user equipment (UE) for performing a hybrid automatic repeat and request (HARQ) procedure in a wireless communication system, the user equipment (UE) comprising:
    a processor; and
    a memory containing instructions, which when executed, cause the processor to:
    receive one or more control channels carrying downlink scheduling information from a base station (BS),
    wherein each control channel carries specific information indicating a total number of control channels transmitted from the BS to the UE;
    determine whether the total number of control channels transmitted to the UE is identical to the number of control channels received at the UE, and
    transmit information based on whether the total number of control channels transmitted to the UE is identical to the number of control channels received at the UE.

13. The user equipment (UE) according to claim 12, wherein the control channel includes a physical downlink control channel (PDCCH).

14. The user equipment (UE) according to claim 12, wherein the one or more control channels are simultaneously received.

15. The user equipment (UE) according to claim 12, wherein the instructions further cause the processor to:
    omit a process for transmitting acknowledgement/negative acknowledgement (ACK/NACK) information to the BS, if the total number of control channels transmitted to the UE is different from the number of control channels received at the UE.

16. The user equipment (UE) according to claim 12, wherein the instructions further cause the processor to:

transmit NACK information to the BS, if the total number of control channels transmitted to the UE is different from the number of control channels received at the UE.

17. A user equipment (UE) for performing a hybrid automatic repeat and request (HARQ) procedure in a wireless communication system, the user equipment (UE) comprising:

a processor; and a memory containing instructions, which when executed, cause the processor to:

receive one or more downlink control channels carrying downlink scheduling information from a base station (BS), wherein each downlink control channel carries information indicating an order value of each downlink control channel within a plurality of downlink control channels transmitted from the BS to the UE; and determine whether or not the one or more downlink control channels received from the BS are contiguous in order, and transmit information based on whether or not the one or more downlink control channels received from the BS are contiguous in order.

18. The user equipment (UE) according to claim 17, wherein the one or more downlink control channels are simultaneously received.

19. The user equipment (UE) according to claim 17, omit a process for transmitting acknowledgement/negative acknowledgement (ACK/NACK) information to the BS, if order values of the received one or more control channels are not contiguous.

20. The user equipment (UE) according to claim 17, wherein the instructions further cause the processor to: transmit NACK information to the BS, if order values of the received one or more control channels are not contiguous.

21. The user equipment (UE) according to claim 17, wherein the instructions further cause the processor to:

transmit ACK/NACK information where downlink data corresponding to a downlink physical channel of a non-received order value is set to NACK information to the BS, if order values of the received one or more control channels are not contiguous.

22. The user equipment (UE) according to claim 17, wherein the instructions further cause the processor to:

transmit ACK/NACK information to the BS over an uplink control channel corresponding to a downlink control channel having a last order value, if order values of the received one or more control channels are not contiguous.

* * * * *